US012450974B2

(12) United States Patent
Haushalter et al.

(10) Patent No.: US 12,450,974 B2
(45) **Date of Patent: *Oct. 21, 2025**

(54) SYSTEMS, METHODS, AND MEDIA FOR REMOVING PLAYING CARDS FROM A GAMING TABLE

(71) Applicant: Evolution Malta Limited, St. Julians (MT)

(72) Inventors: Todd Haushalter, St. Julians (MT); Alexander Goodman, Riga (LV); Raivis Rengelis, Riga (LV); Aleksejs Blinovs, Riga (LV)

(73) Assignee: Evolution Malta Limited, St. Julians (MT)

( * ) Notice: Subject to any disclaimer, the term of this patent is extended or adjusted under 35 U.S.C. 154(b) by 259 days.

This patent is subject to a terminal disclaimer.

(21) Appl. No.: 17/971,384

(22) Filed: Oct. 21, 2022

(65) Prior Publication Data

US 2023/0186719 A1 Jun. 15, 2023

Related U.S. Application Data

(63) Continuation of application No. 17/020,367, filed on Sep. 14, 2020, now Pat. No. 11,482,071.

(Continued)

(51) Int. Cl.

| | |
|---|---|
| ***G07F 17/32*** | (2006.01) |
| ***A63F 1/00*** | (2006.01) |
| ***A63F 1/06*** | (2006.01) |

(52) U.S. Cl.

CPC ............ *G07F 17/322* (2013.01); *A63F 1/067* (2013.01); *G07F 17/3211* (2013.01);

(Continued)

(58) Field of Classification Search

CPC ............... G07F 17/322; G07F 17/3211; G07F 17/3293; A63F 1/067; A63F 2001/003;

(Continued)

(56) References Cited

U.S. PATENT DOCUMENTS

2010/0311488 A1* 12/2010 Miller ........................ A63F 1/12 463/31
2014/0370958 A1* 12/2014 Lutnick ................. G07F 17/322 463/25

(Continued)

OTHER PUBLICATIONS

Notice of Allowance dated Jun. 24, 2022 in U.S. Appl. No. 17/020,367, pp. 1-18.

(Continued)

*Primary Examiner* — Pierre E Elisca
(74) *Attorney, Agent, or Firm* — Byrne Poh LLP

(57) ABSTRACT

Mechanism (which can include system, methods, and media) for removing a card from a gaming table are provided, the mechanisms comprising: detecting when a playing card is placed on a door on a table surface of a gaming table; and causing the door to automatically open downward when the playing card is detected as being placed on the door so that the playing card slides downward to a space below the table surface. In some embodiments, these mechanisms further comprise controlling the opening of the door using a hardware processor, and optionally using stepper motor to control the opening of the door. In some embodiments, these mechanisms further comprise generating a graphics version of the playing card; and presenting the graphics version of the playing card on a player's computer display after the playing card has slid below the table surface.

27 Claims, 25 Drawing Sheets

Related U.S. Application Data

(60) Provisional application No. 62/901,601, filed on Sep. 17, 2019, provisional application No. 62/900,388, filed on Sep. 13, 2019.

(52) U.S. Cl.
CPC .... *G07F 17/3293* (2013.01); *A63F 2001/003* (2013.01); *A63F 2001/005* (2013.01)

(58) Field of Classification Search
CPC ............ A63F 2001/005; A63F 11/0002; A63F 2009/2444; A63F 1/14
USPC ................................................ 463/11, 12, 13
See application file for complete search history.

(56) References Cited

U.S. PATENT DOCUMENTS

| | | | | |
|---|---|---|---|---|
| 2017/0249806 | A1* | 8/2017 | Lutnick | G07F 17/3293 |
| 2020/0302744 | A1* | 9/2020 | Lutnick | G07F 17/32 |

OTHER PUBLICATIONS

Office Action dated Feb. 18, 2022 in U.S. Appl. No. 17/020,367, pp. 1-14.

* cited by examiner

SYSTEMS, METHODS, AND MEDIA FOR REMOVING PLAYING CARDS FROM A GAMING TABLE

CROSS REFERENCE TO RELATED APPLICATIONS

This application is a continuation of U.S. patent application Ser. No. 17/020,367, filed Sep. 14, 2022, which claims the benefit of U.S. Provisional Patent Application No. 62/900,388, filed Sep. 13, 2019, and U.S. Provisional Patent Application No. 62/901,601, filed Sep. 17, 2019, each of which is hereby incorporated by reference herein in its entirety.

BACKGROUND

Live-dealer online gambling has become very popular in recent years. In live-dealer online gambling, a real (as opposed to computer generated), live dealer in a casino or a studio deals a casino gambling game, such as blackjack, to one or more players who are remote from the dealer. One or more cameras and microphones capture video and audio of the dealer and surrounding environment (which may include a real (as opposed to computer generated) gaming table, such as a blackjack table) and transmit the video and audio to the player(s) for presentation on their computer(s). For example, in live-dealer online blackjack, the video may show the dealer dealing real (as opposed to computer generated) playing cards to up to seven locations (each a virtual seat) on the real gaming table. The computer(s) of the player(s) may also present a graphical user interface that is presented with the video and audio that enables the player(s) to make wagers, see information about the game (such as game history, available wager options, etc.), and chat with dealer and/or other players.

A limitation of many approaches to live-dealer online gambling is that there is a limit to the number of players that can virtually sit at a gaming table. For example, in many instances of live-dealer online blackjack, a maximum of seven players can participate in gaming at a table.

Accordingly, new mechanisms for live-dealer online gambling are desired.

SUMMARY

In accordance with some embodiments, systems, methods, and media for removing playing cards from a gaming table are provided.

In some embodiments, systems for removing a card from a gaming table are provided, the systems comprising: a gaming table having a table surface; and a door mounted on the table surface, wherein the door is configured to automatically open downward when a playing card is placed on the door so that the playing card slides downward to a space below the table surface. In some of these embodiments, the systems further comprise a hardware processor that detects when the playing card is placed on the door and controls the opening of the door, and optionally further comprise a stepper motor that is controlled by the hardware processor and that is coupled to the door so that the stepper motor can cause the door to open under the control of the hardware processor. In some of these embodiments, the systems further comprise a sensor on the door that detects the presence of the playing card on the door, wherein the sensor is optionally an optical sensor. In some of these embodiments, the systems further comprise a hardware processor that generates a graphics version of the playing card and presents the graphics version of the playing card on a player's computer display after the playing card has slid below the table surface. In some of these embodiments, the systems further comprise a container positioned below the table surface that captures the playing card, and optionally: (1) a rail to which the container is coupled and a motor that causes the container to move from a position proximate to the door to a position proximate to the dealer; and/or (2) wherein the container has an angled platform that is at an angle of 52 degrees relative to a side of the container going from a top of the container to a bottom of the container.

In some embodiments, methods for removing a card from a gaming table are provided, the methods comprising: detecting when a playing card is placed on a door on a table surface of a gaming table; and causing the door to automatically open downward when the playing card is detected as being placed on the door so that the playing card slides downward to a space below the table surface. In some embodiments, these methods further comprise controlling the opening of the door using a hardware processor, and optionally using a stepper motor to control the opening of the door. In some embodiments, the detecting uses a sensor on the door that detects the presence of the playing card on the door, wherein the sensor is optionally an optical sensor. In some embodiments, these methods further comprise generating a graphics version of the playing card; and presenting the graphics version of the playing card on a player's computer display after the playing card has slid below the table surface. In some embodiments, these methods further comprise positioning a container below the table surface that captures the playing card, and optionally: (1) coupling the container to a rail and causing the container to automatically move from a position proximate to the door to a position proximate to the dealer; and/or wherein the container has an angled platform that is at an angle of 52 degrees relative to a side of the container going from a top of the container to a bottom of the container.

In some embodiments, non-transitory computer-readable media containing computer executable instructions that, when executed by a processor, cause the processor to perform a method for removing a card from a gaming table are provided, the method comprising: detecting when a playing card is placed on a door on a table surface of a gaming table; and causing the door to automatically open downward when the playing card is detected as being placed on the door so that the playing card slides downward to a space below the table surface. In some embodiments these non-transitory computer-readable media, the method further comprises: generating a graphics version of the playing card; and presenting the graphics version of the playing card on a player's computer display after the playing card has slid below the table surface.

DETAILED DESCRIPTION

Figure 1:
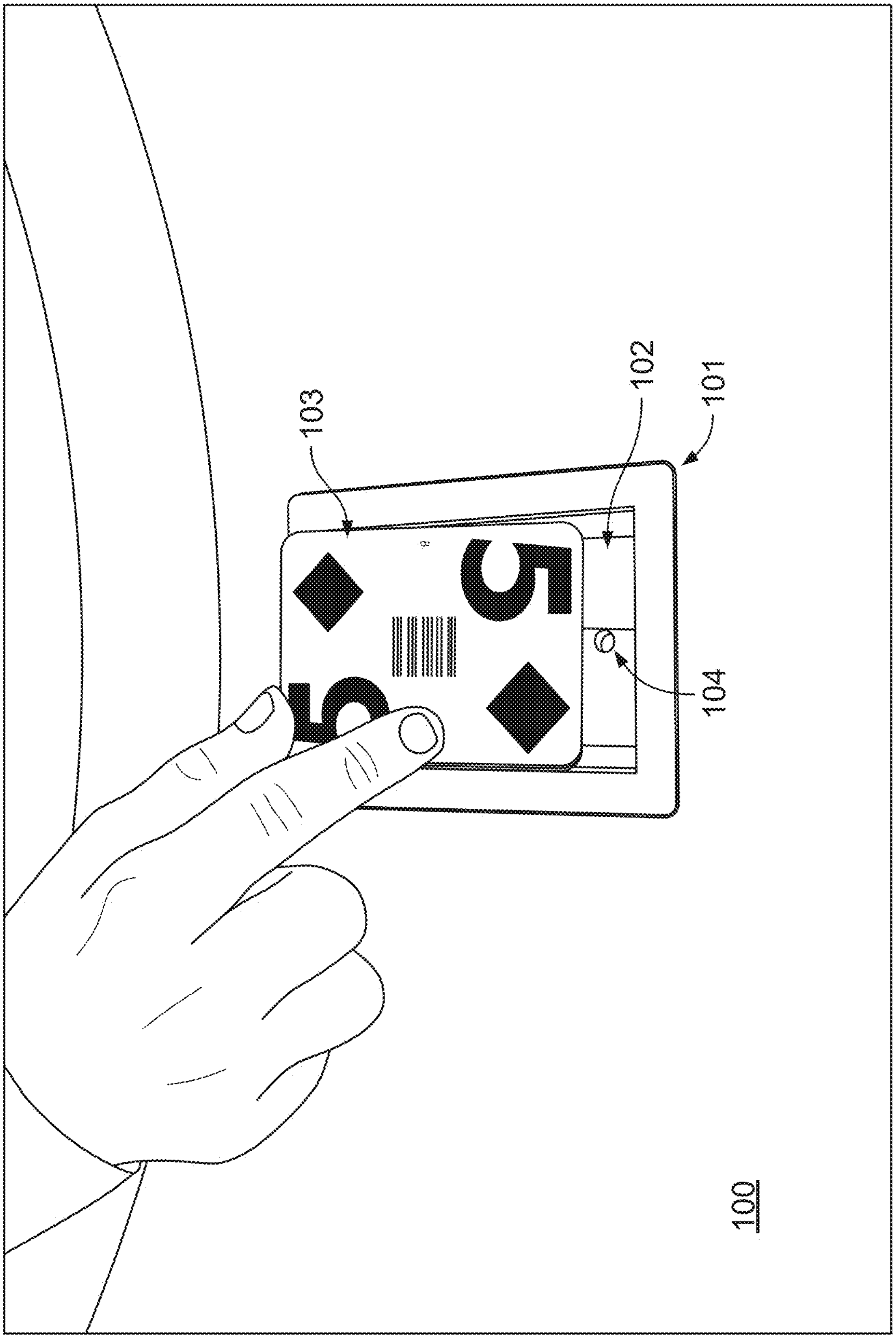
FIG. 1 is an example of a mechanism for removing a card from a gaming table in accordance with some embodiments.

Turning to FIG. 1, an illustration of an example of a mechanism for removing a card from a gaming table 100 in accordance with some embodiments is shown. As illustrated, a dealer (or other game participant, or any suitable mechanism (e.g., a robotic arm) may place a card 103 on top of a door 102 of a card handling mechanism 101, in some embodiments. The card can be any suitable playing card, and it can be any suitable size and shape, in some embodiments. For example, as shown, the card can be a five of diamonds card with a barcode that identifies it as such, and it can be suitable for playing Blackjack and/or any other playing card games, such as poker, in some embodiments.

Figure 2:
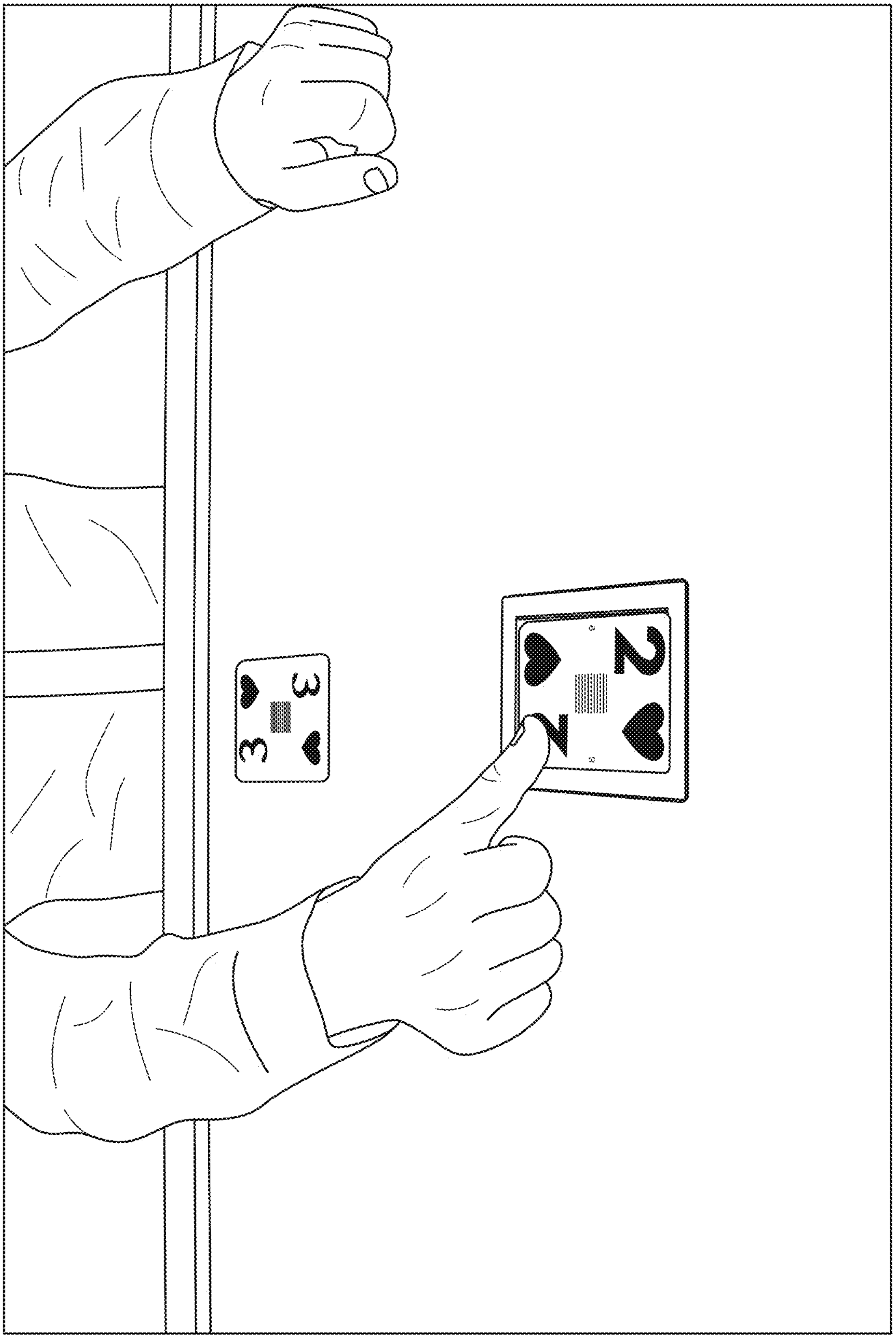
FIG. 2 is an example of a playing card on a door in gaming table in accordance with some embodiments.

A sensor on door 102 can detect that when card 103 has been placed on the door, such as shown in FIG. 2, in some embodiments. Any suitable sensor can be used in some embodiments. For example, the sensor can be an optical sensor that detects reflected light from the card passing through hole 104 in door 102 in some embodiments. As another example, the sensor can be a weight sensor that detects the weight of the card or the dealers fingers (or finger press) on the door in some embodiments. As yet another example, the sensor can be a camera (e.g., video camera) that detects the card be located on the door in some embodiments.

Figure 3:
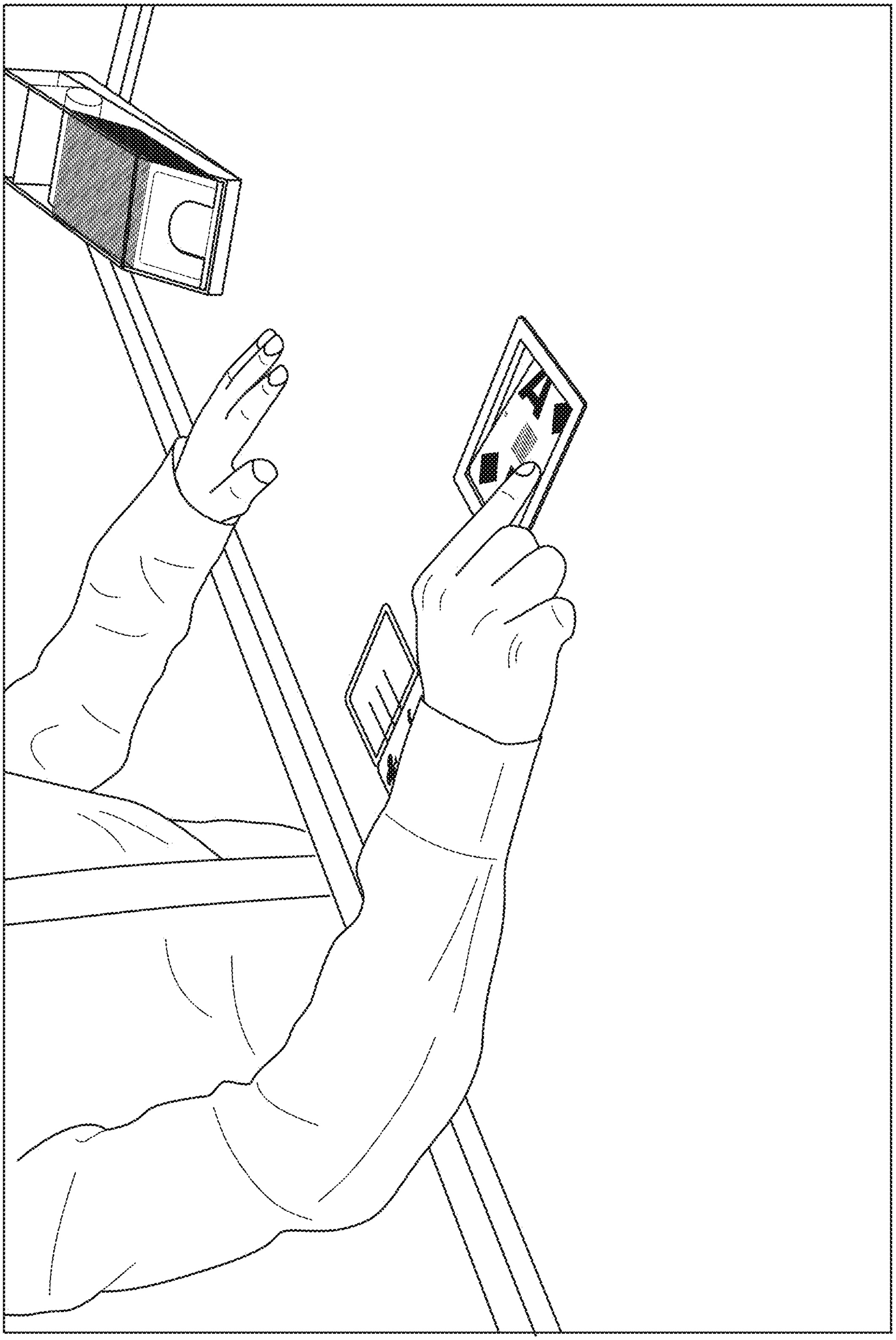
FIG. 3 is an example of a door in a gaming table beginning to open downward in accordance with some embodiments.
Figure 4:
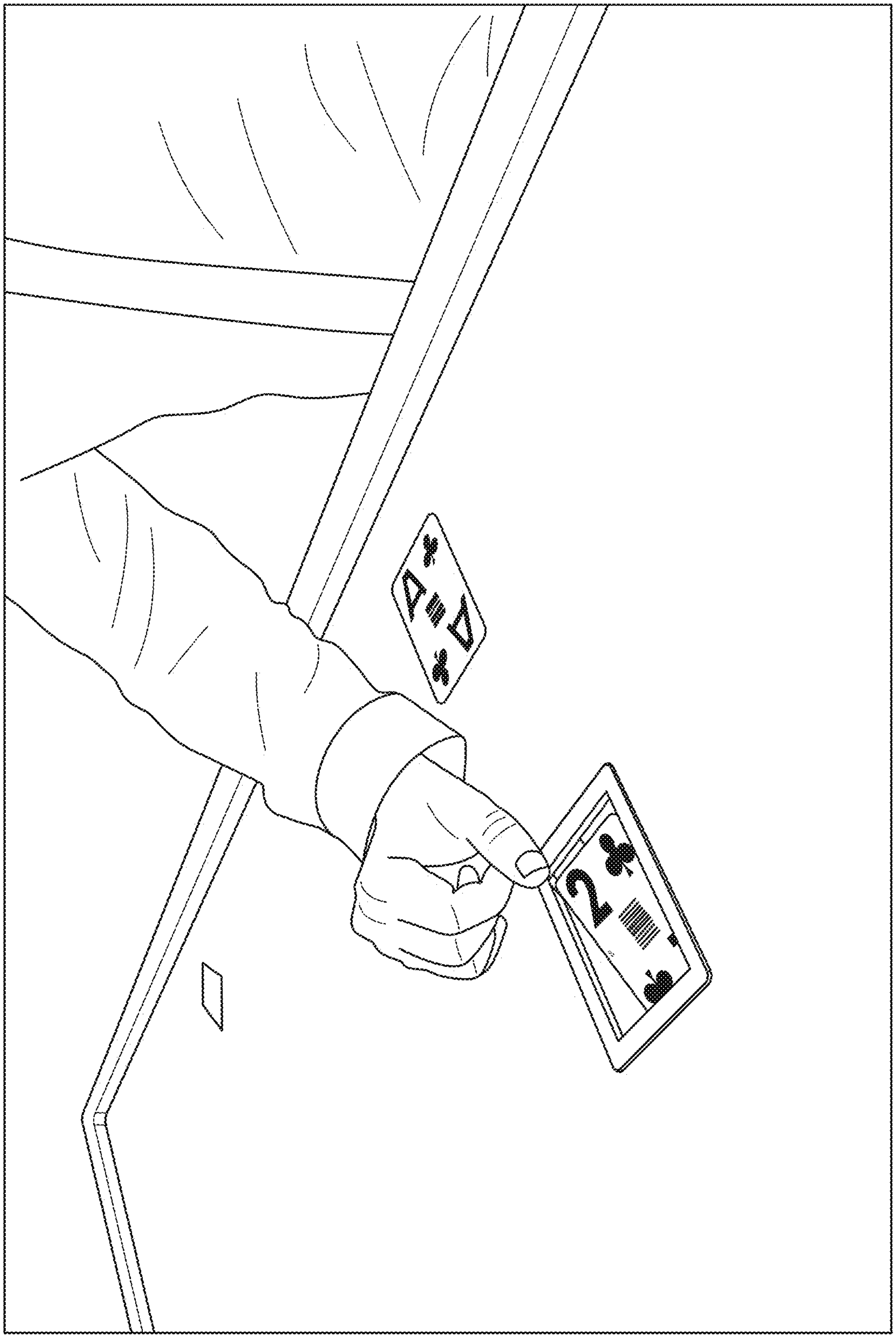
FIGS. 4-6 are examples of a door in a gaming table continuing to tilt further downward until a playing card thereon slides off the door into the space below in accordance with some embodiments.
Figure 5:
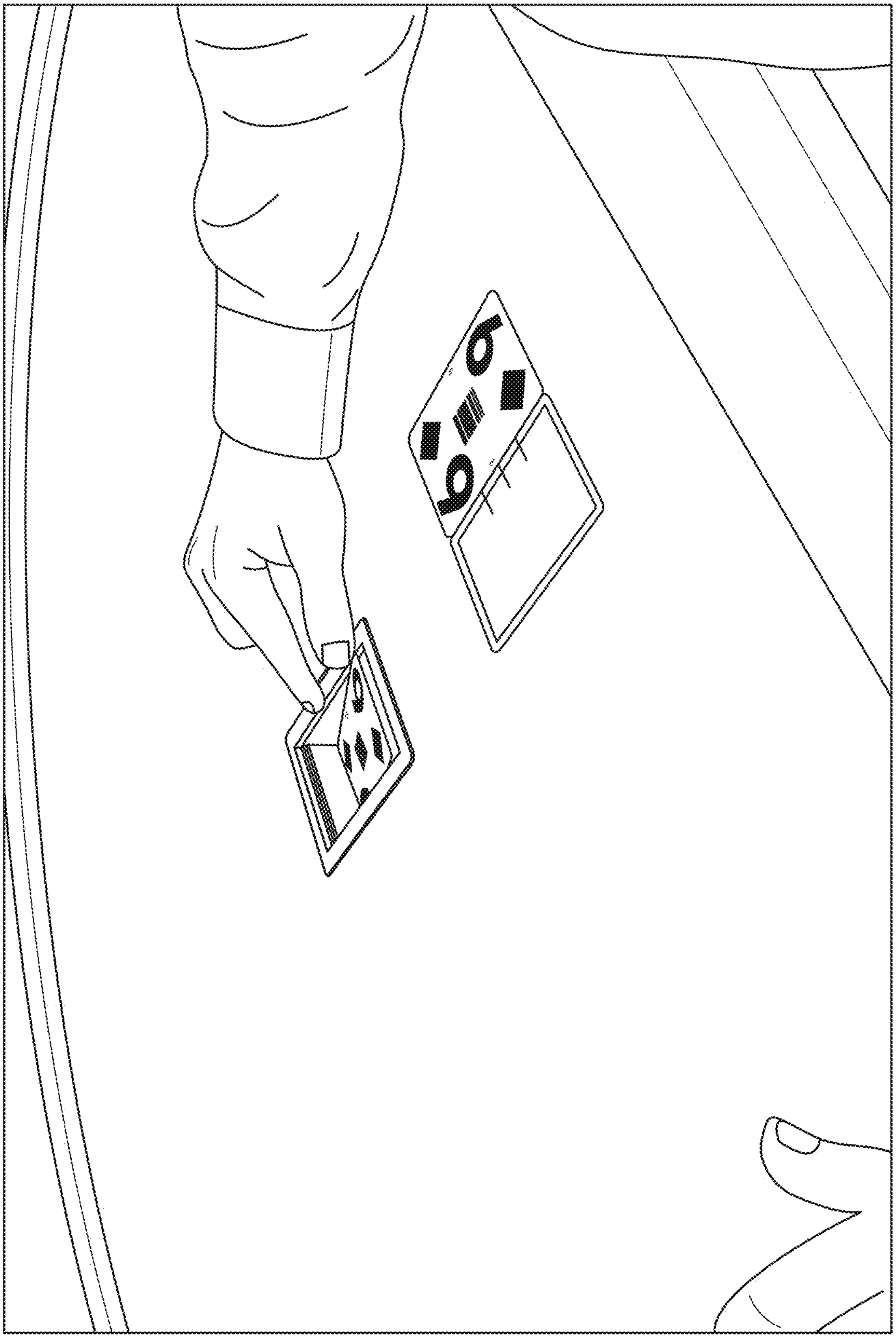
Figure 6:
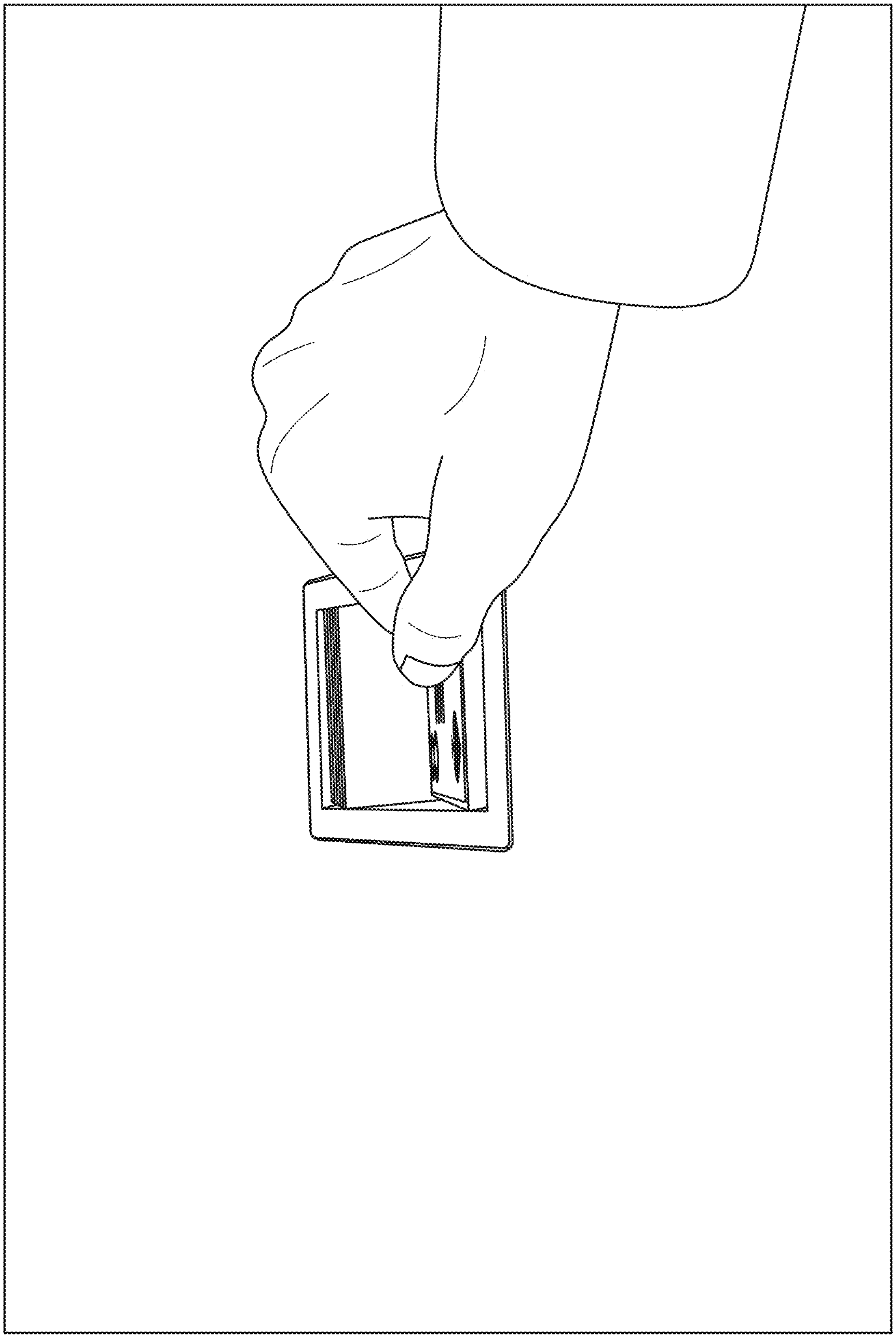

Upon detecting that the card is on the door, or after any suitable delay (e.g., 0.5 seconds, 1 second, 2 seconds, etc.), door 102 can begin to tilt downward, as shown in FIG. 3, so that the playing card will slide into a space below table 100, in some embodiments. As shown in FIGS. 4-6, the door will continue to tilt further downward until the card slides off the door into the space below, in some embodiments.

The door may tilt downward to any suitable maximum downward angle, such as 45 degrees, 50 degrees, 55 degrees, 60 degrees, 65 degrees, 70 degrees, 75 degrees, 80 degrees, 85 degrees, 90 degrees, and/or any suitable angle (e.g., such as any degree value (67.5 degrees) in this overall range, in some embodiments. The door may tilt downward at any suitable speed, in some embodiments.

Figure 7:
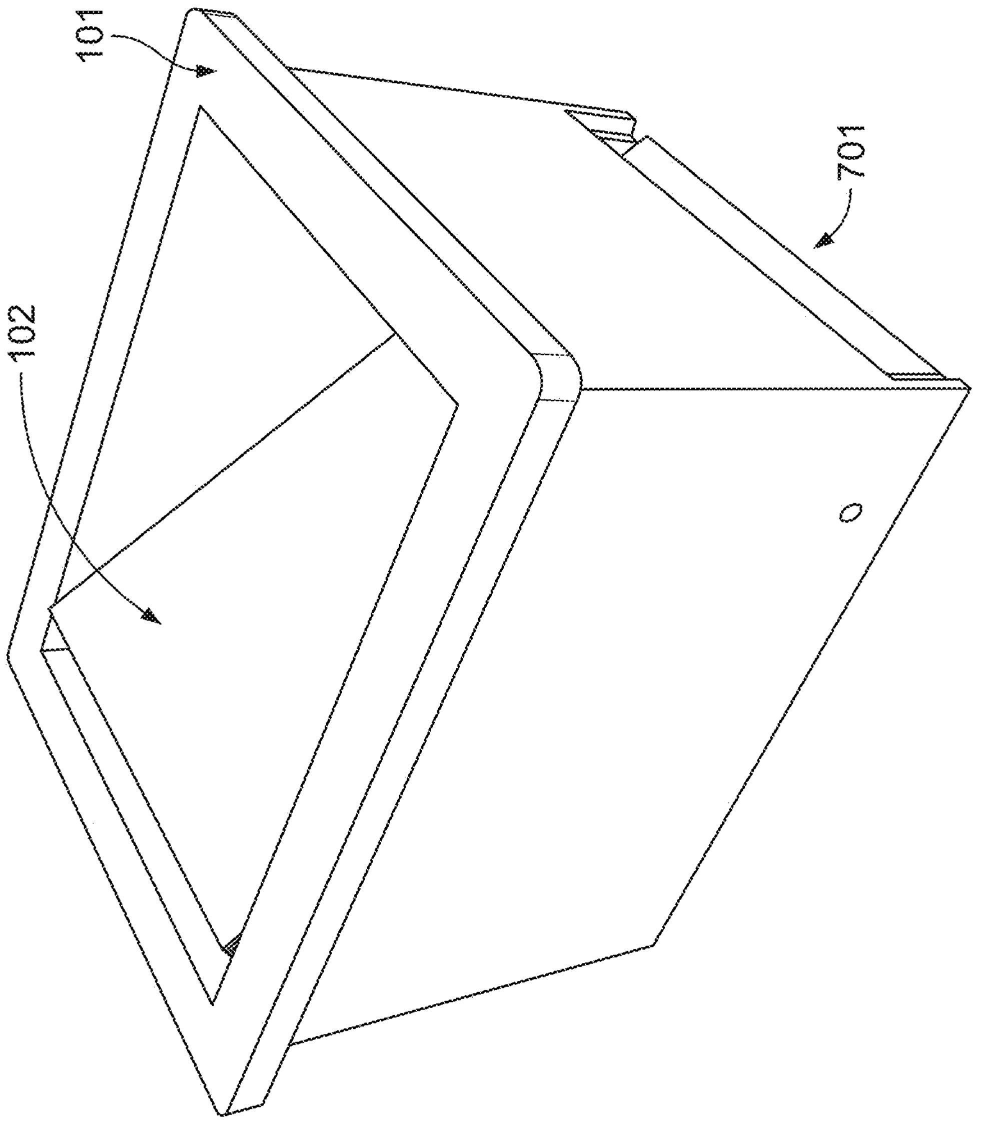
FIG. 7 is an example of a mechanism including a door for a gaming table in accordance with some embodiments.

FIG. 7 shows an illustration of an example of a mechanism 101, including door 102, in accordance with some embodiments. As shown in FIG. 1, the top portion of mechanism 101 and door 102 can be mounted to be flush or nearly flush with the top of a gaming table, such as table 100.

A slot 701 can be present at or near the bottom of mechanism 101 so that the card can fall from above mechanism 101 to the bottom of, or below, mechanism 101, in some embodiments. Although slot 701 is shown on the side of mechanism 101 in FIG. 7, slot 701 can be located on the bottom or mechanism 101, in some embodiments.

Slot 701 and mechanisn 101 can have any suitable shape and sizes in some embodiments. For example, slot 701 and mechanism 101 can have the relative sizes and the shapes shown in FIG. 7 and/or the other figures.

Figure 8A:
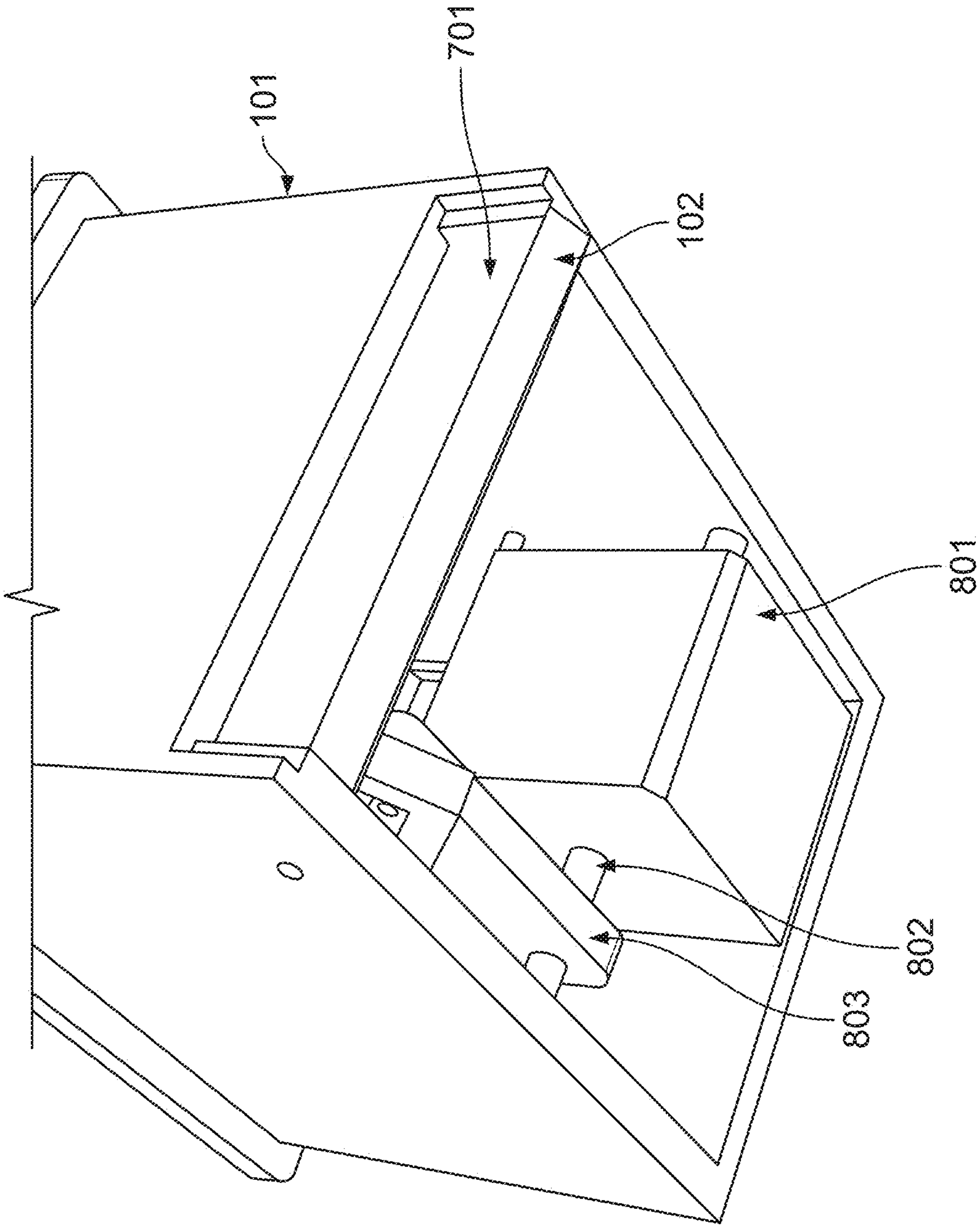
FIG. 8A is an example of the bottom of the mechanism in FIG. 7 in accordance with some embodiments.

FIG. 8A shows an illustration of the bottom of an example of a mechanism 101 in accordance with some embodiments. As shown, door 102 is in the downward position such that a card placed on the top of door 102 could slide down through slot 701 of mechanism 101. As also shown, in some embodiments, the door can be controlled by a stepper motor 801 that is mechanically coupled to the door via a shaft 802 and linkage 803.

Figure 8B:
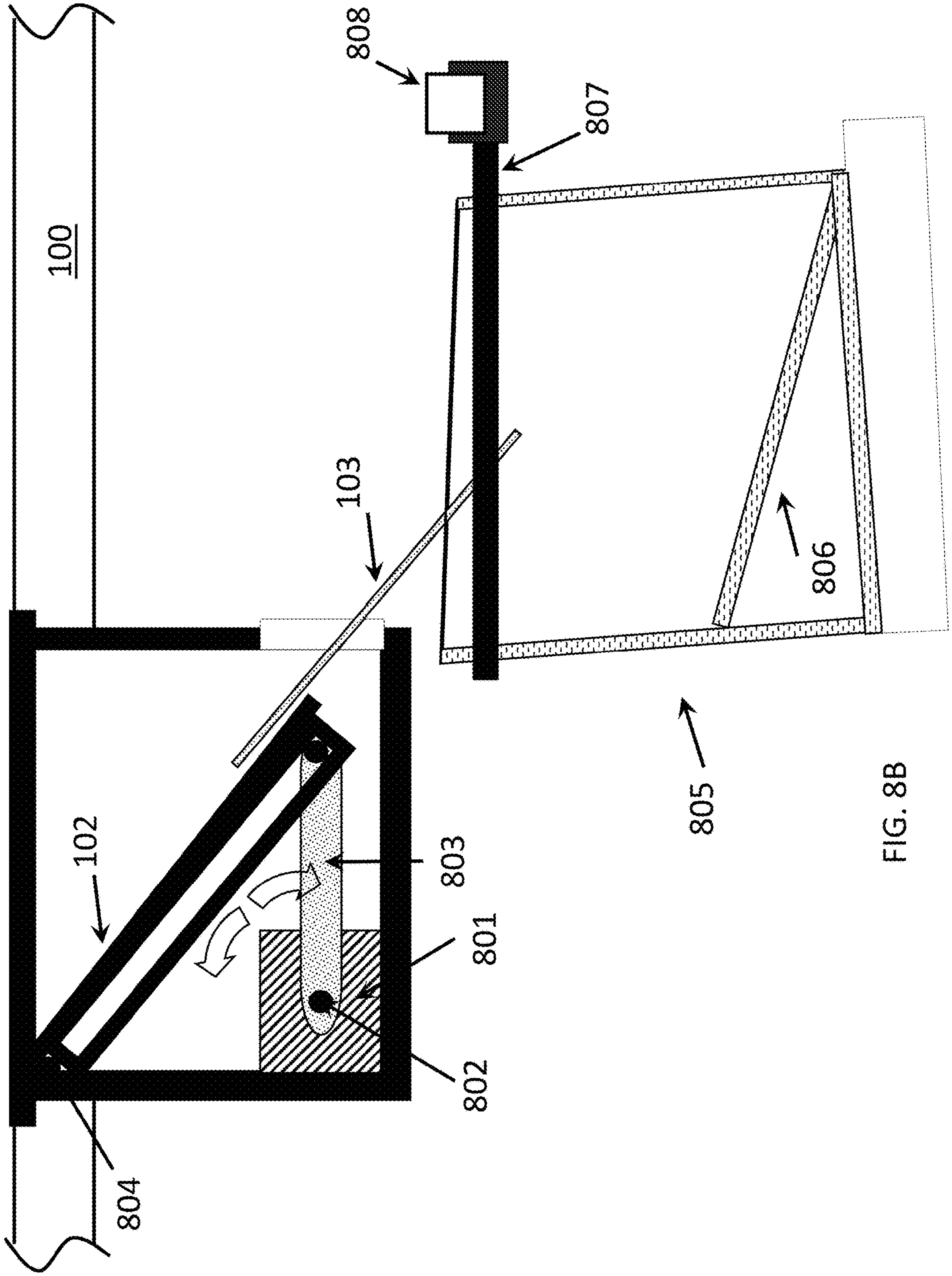
FIG. 8B is an example of a cross section of the mechanism shown in FIGS. 7 and 8A in accordance with some embodiments.

For example, as also shown in FIG. 8B, which is a cross section of what is shown in FIG. 8A, door 102 can be mounted at one end using a springed hinge 804 in some embodiments. This springed hinge can allow door 102 to move between a closed/horizontal position (e.g., as shown in FIG. 1) and a downward position as shown in FIGS. 8A and 8B, as well as push door 102 upward into the closed or horizontal position (e.g., as shown in FIG. 1) when stepper motor 801 is otherwise not pulling door 102 downward via shaft 802 and linkage 803.

When desired, stepper motor 801 can rotate shaft 802 clockwise 90 degrees (or any other suitable amount) causing linkage 803 to rotate from a vertical orientation (not shown) to a horizontal orientation (as shown in FIG. 8B). Card 103 can then slide off door 102 through slot 701 and into container 805.

As is described further below, in some embodiments, container 805 can have an angled platform 806 on which cards stack. In some embodiments, rather than having a platform in contain 805, the bottom of container 805 can be angled so as to allow the cards to stack properly. For example, in some embodiments, the angled platform can be at an angle of 52 degrees relative to a side of the container going from the top of the container to the bottom of the container.

In some embodiments, container 805 can be held in place by an arm 807 that is moveably coupled to a rail 808.

Figure 9:
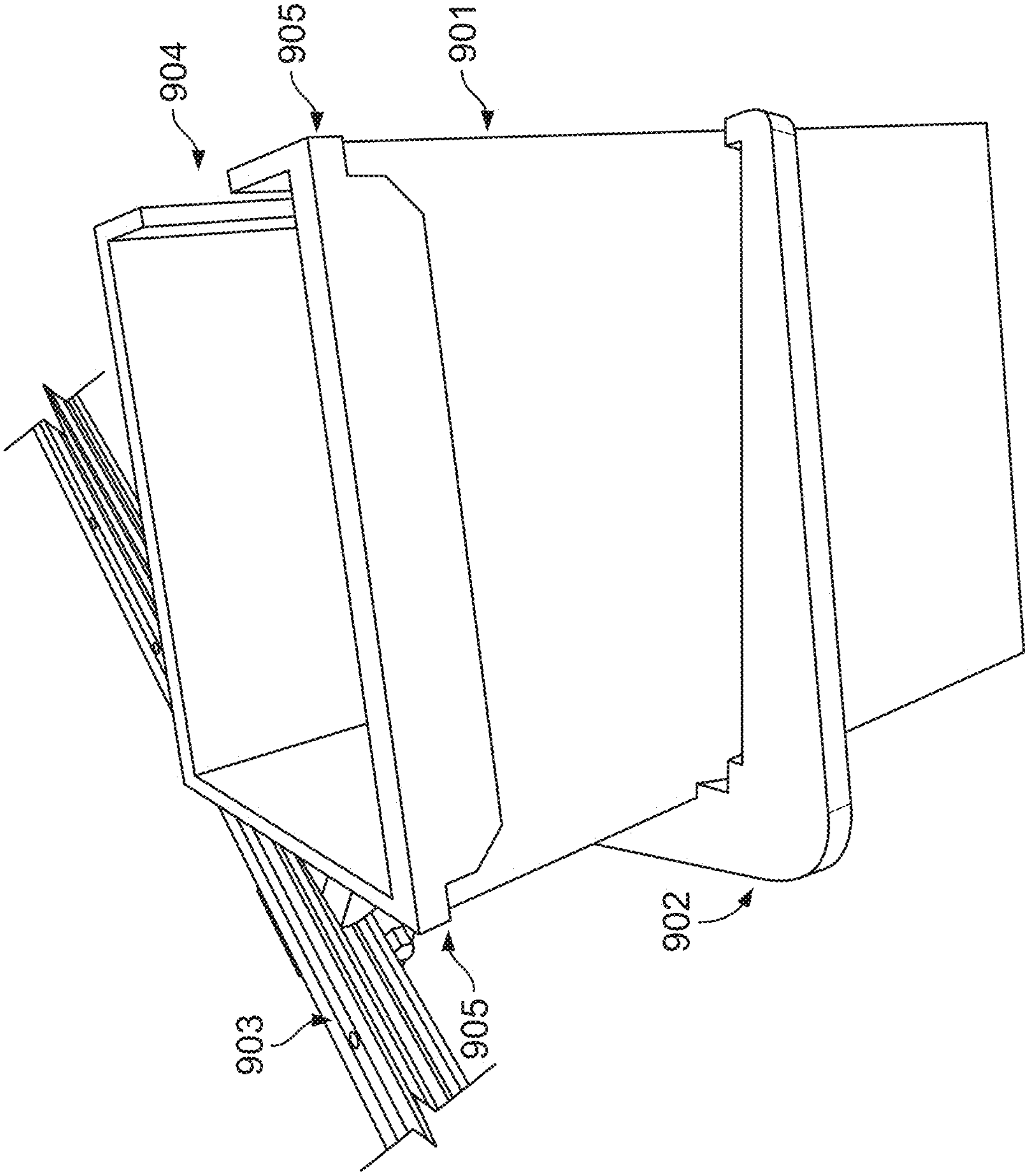
FIGS. 9-12 are example views of a container for capturing cards, and an arm and a rail for transporting the container and the cards in accordance with some embodiments.
Figure 10:
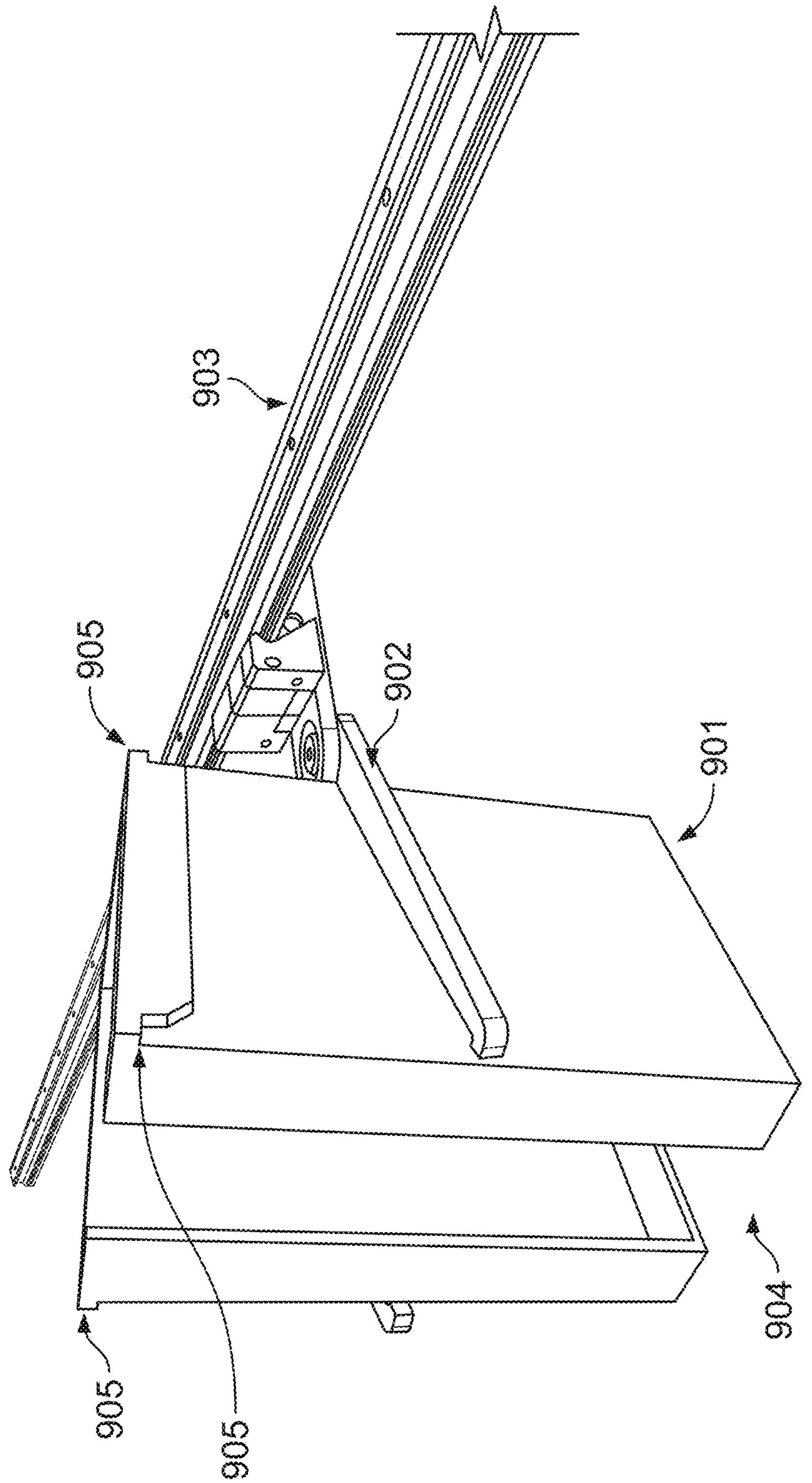

FIGS. 9 and 10 illustrate another example of a container 901, arm 902, and rail 903. As shown with container 901, a container may have a slot 904 therein to facilitate removing cards from the container. In some embodiments, container 901 can be positioned lower in arm 902 so that lip 905 sits on top of arm 902. In some embodiments, container 901 can further include a platform as illustrated in FIG. 8B although not shown in FIG. 10.

Figure 11:
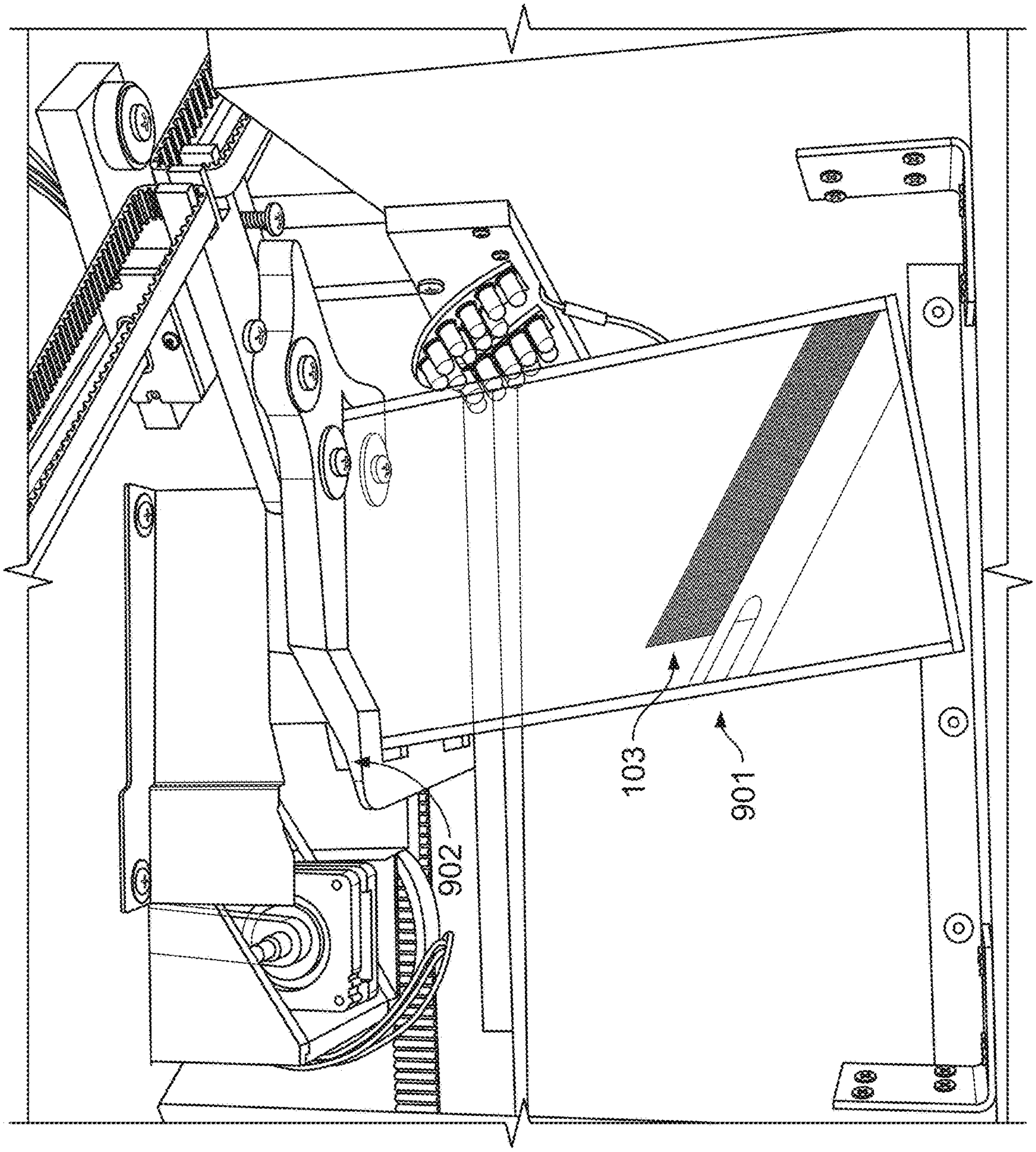
Figure 12:
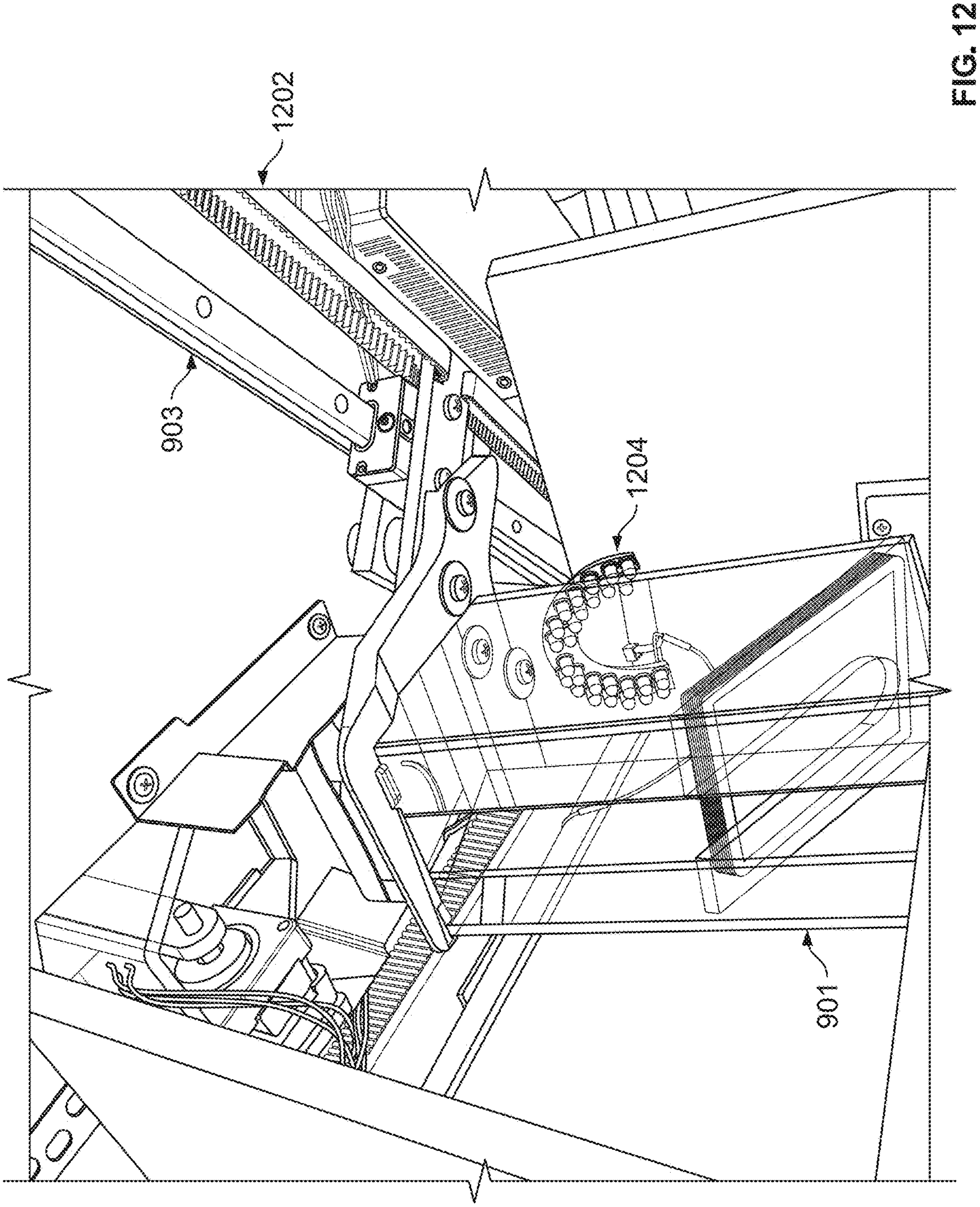

Turning to FIGS. 11 and 12, illustrations of a prototype of a container 901 containing cards 103 are provided in accordance with some embodiments. As shown, the container is held by arm 902, which is coupled to rail 903. Rail 903 can be mounted via any suitable structure to the bottom of table 100 and can run from the position shown in FIGS. 11 and 12 (i.e., near door 102) to a position close to the dealer so that the dealer can remove cards from container 901 when appropriate. When appropriate, arm 902 can be moved along rail 903 by a belt 1202 that is driven by a motor (not shown), such as a stepper motor or any other suitable motor.

Any suitable materials can be used to form container 901 in some embodiments. However, it may be beneficial to form the container from clear plastic (or any other suitable clear material) so that cards inside the container can be observed by cameras, such as camera 1204, to make sure the cards are stacking properly and prevent tampering.

Turning to FIG. 13-26, illustrations of game play using mechanism 101 is shown in accordance with some embodiments. As illustrated, this game play can be via a live online interface in some embodiments. A player can participate in a game using a computing device (e.g., a desktop computer, a laptop computer, a mobile phone, etc.) to connect to a remote server which controls game play and provides video and audio of the dealer and gaming table, in some embodiments. Although game play is illustrated using the game of Blackjack, any suitable game can be used in some embodiments.

Figure 13:
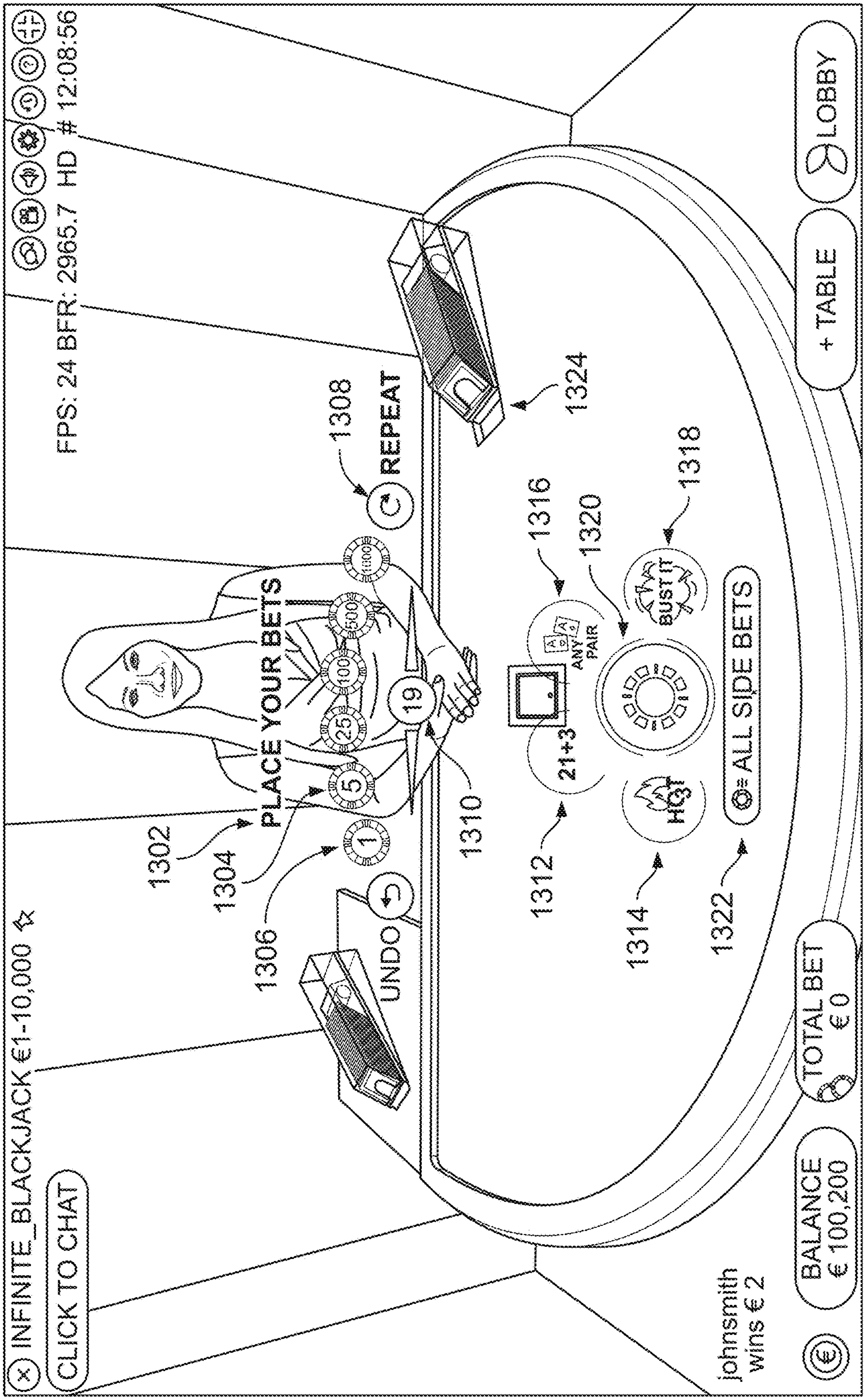
FIG. 13 is an example of a live-dealer online game of blackjack including a graphical user interface in accordance with some embodiments.

Referring to FIG. 13, in some embodiments, a player can initially be presented with a user interface that shows a real live dealer, a real live gaming table, a shoe of real live cards, and an overlay with different computer generated images (graphics) in it. As shown, the graphics can include a message to "place your bets" 1302, wager amount chips 1304, an undo option 1306, a repeat option 1308, a count down timer 1310, side bet options 1312 ("21+3"), 1314 ("Hot 3"), 1316 ("Any Pair"), and 1318 ("Bust It"), a wager button 1320, and an all side bets option 1322. FIG. 13 also shows a card scanner 1324 that can be used to read the values of cards into a computer process.

"Place your bets" message 1302 can be used to advise the player that it is currently time to place bets. Wager amount chips 1304 can be used to select a wager amount. Undo option 1306 can be used to remove a just-placed wager. Repeat option 1308 can be used to repeat a previous wager. Count down timer 1310 presents the time remaining for the user to place a wager. Side bet options 1312 ("21+3"), 1314 ("Hot 3"), 1316 ("Any Pair"), and 1318 ("Bust It") allow a player to place side bets corresponding to rules of each option. Wager button 1320 allows a user to select a wager amount based on a default amount. And all side bets option 1322 allows a user to expand a wager to include all of the side bet options. Other side bet options (e.g., Insurance, Double Down, Split, Hit and Stand, and Six Card Charlie) can be available in some embodiments.

Figure 14:
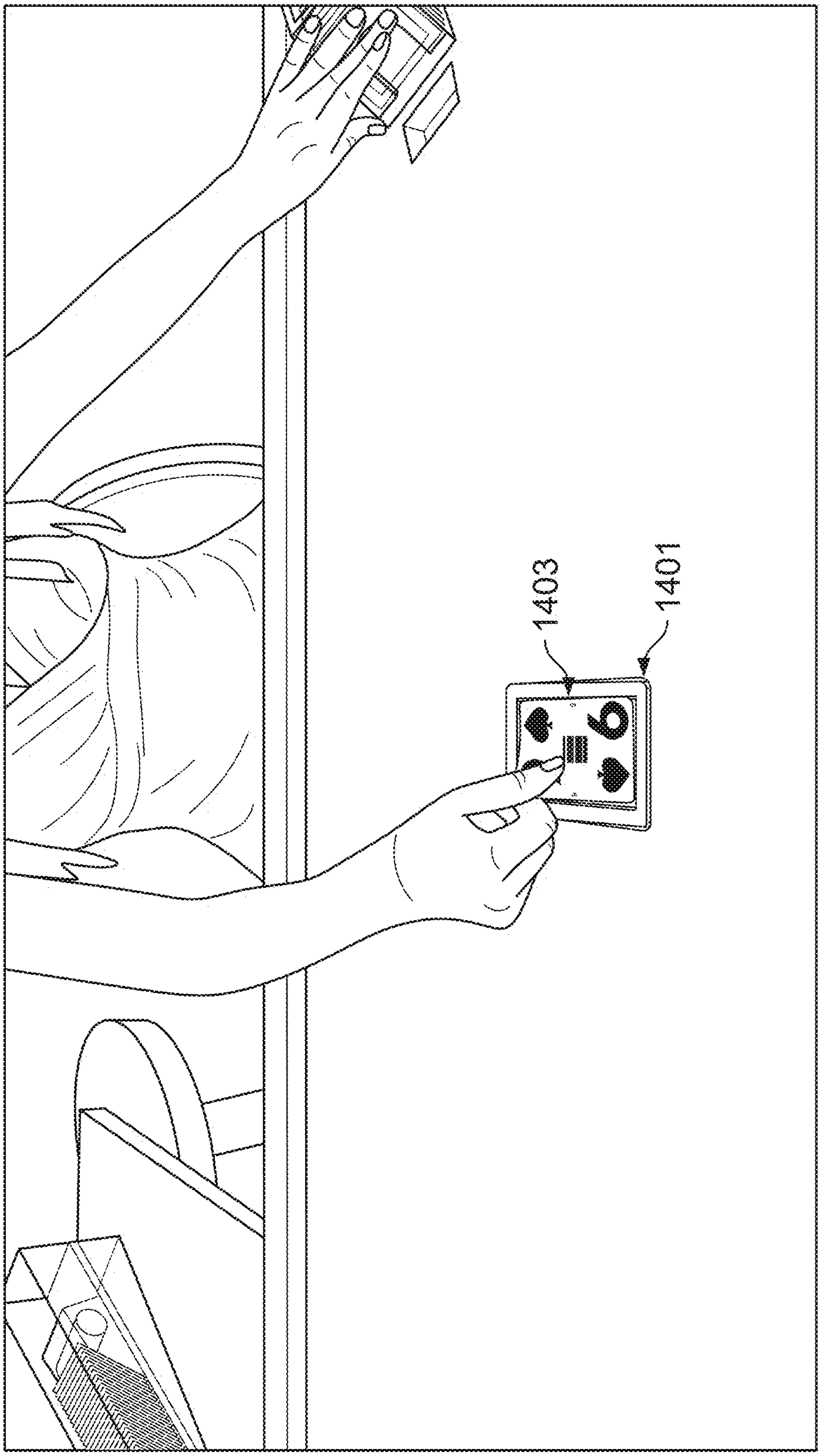
FIG. 14 is an example of a dealer placing a first card on a door of a gaming table in accordance with some embodiments.

Turning to FIG. 14, after a user has elected to place a wager, the dealer will deal an initial player card 1403 and place the card on the door of mechanism 1401. As shown, the door is in the upward position (i.e., horizontal position).

Figure 15:
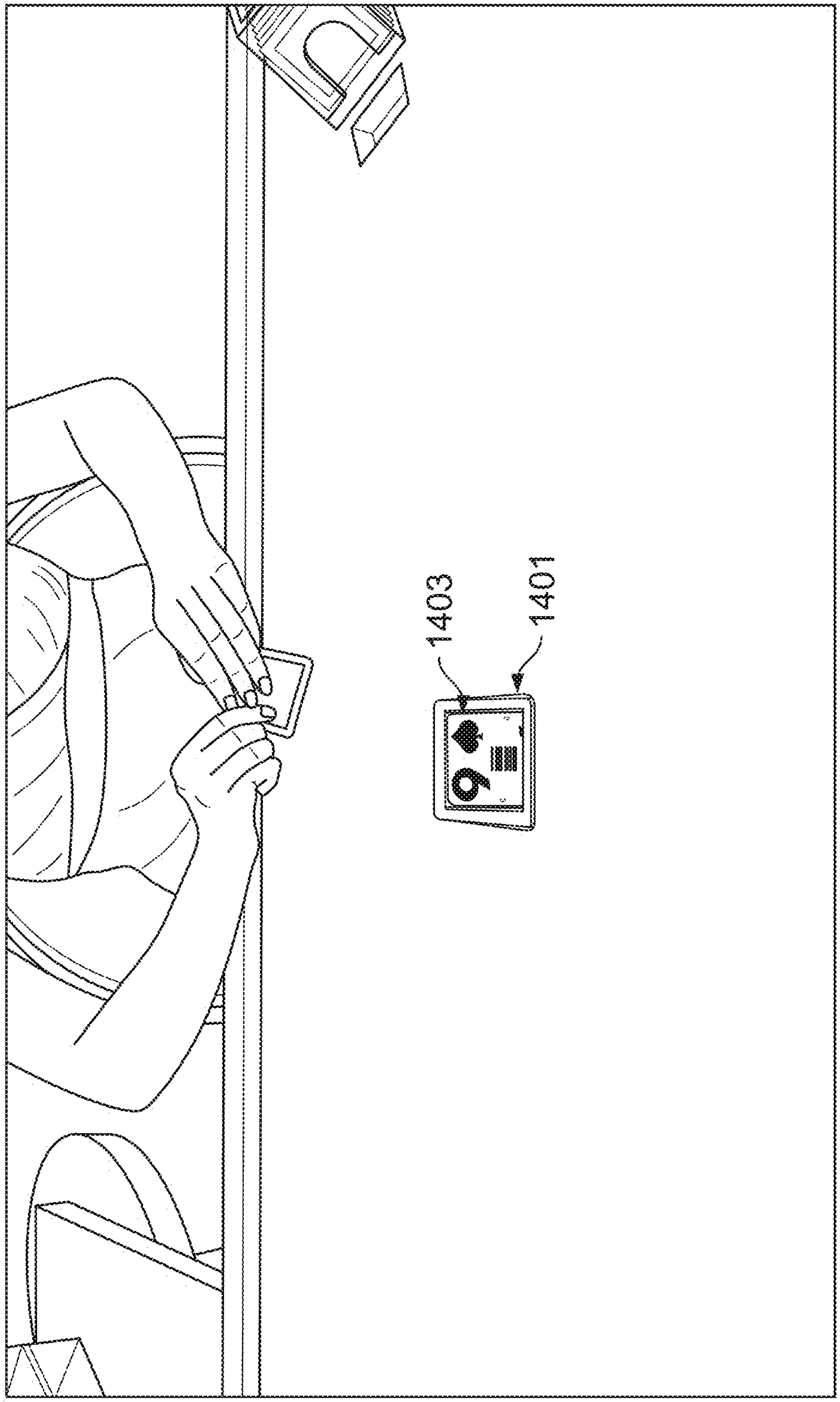
FIG. 15 is an example of the door of FIG. 14 beginning to tilt downward in accordance with some embodiments.

In response to placing the card in this position, a sensor (as described above) detects that the card is on the door. Accordingly, as shown in FIG. 15, mechanism 1401 lowers the door downward so that card 1403 can be removed from the table.

Figure 16:
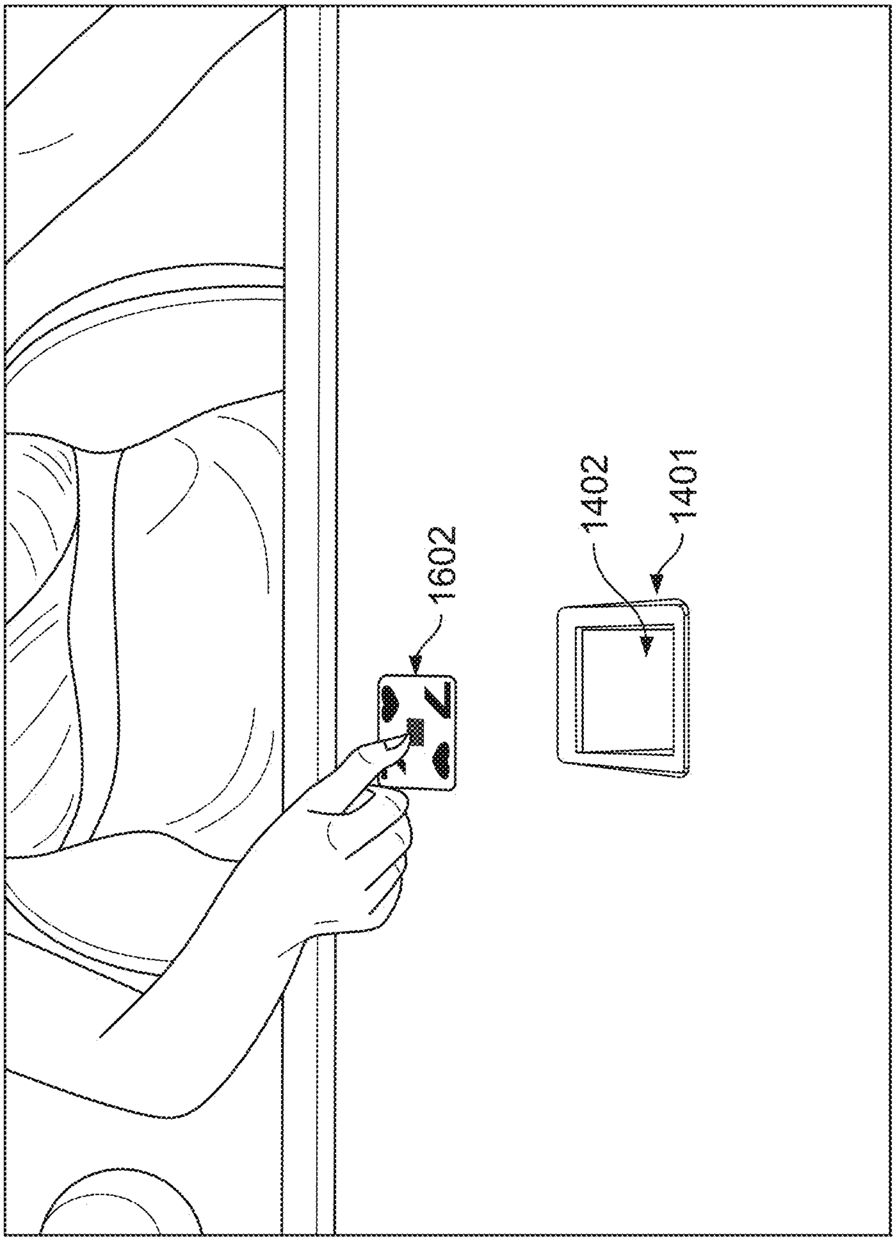
FIG. 16 is an example of the door of a gaming table after the first card has dropped below the gaming table in accordance with some embodiments.

As shown in FIG. 16, by the time door 1402 has reached the downward position, card 1403 (9 of spades in FIG. 15) drops below the table and into a container. At about the same time, the dealer may deal a new card 1602 (7 of hearts) to herself.

After the card has dropped below the table, mechanism 1401 can detect that the card is no longer on the door and then cause the door to move upward into a horizontal (or closed position).

Figure 17:
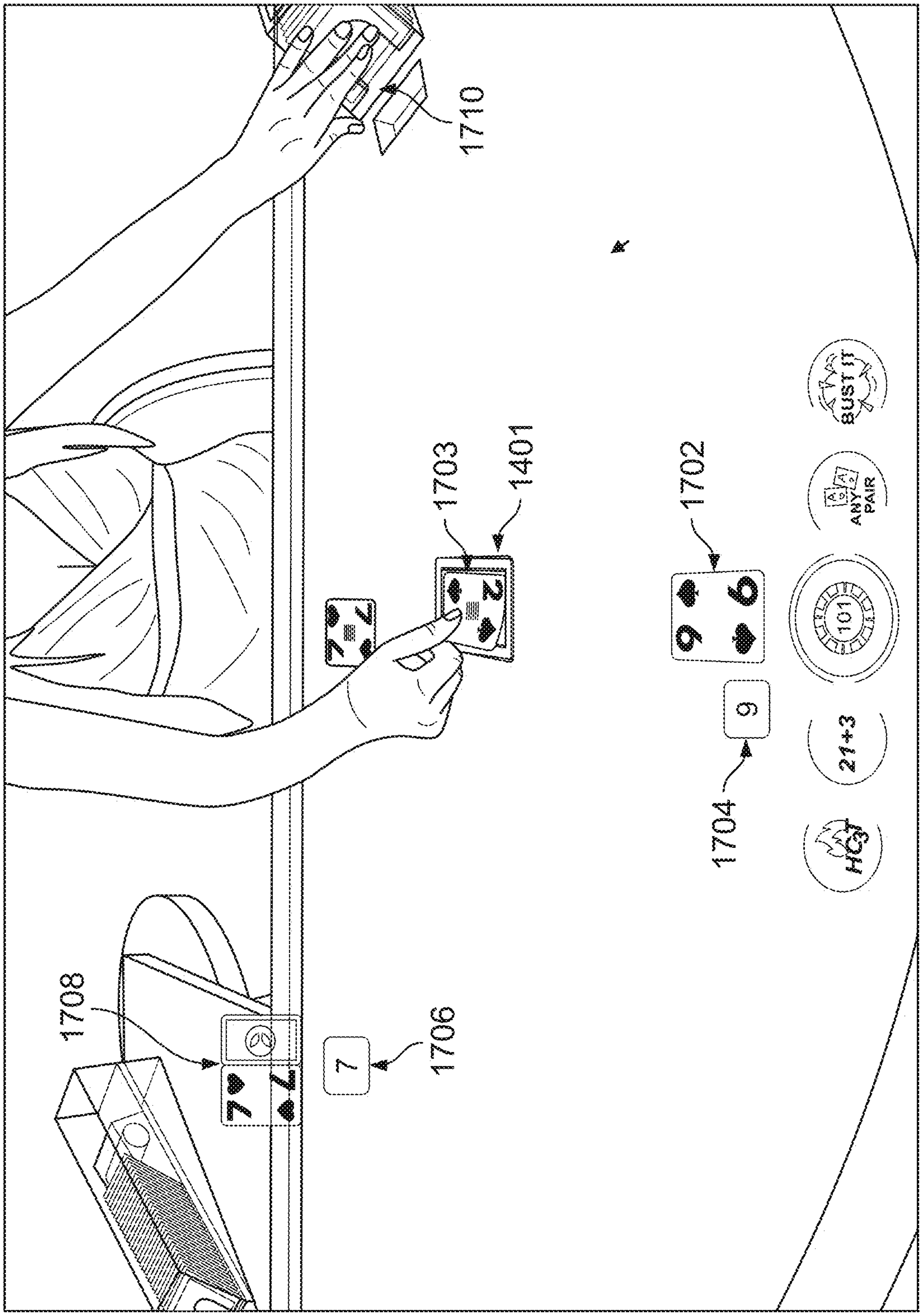
FIG. 17 is an example of a graphics version of the first card being presented to a player and a dealer placing a second card on the door in accordance with some embodiments.

As shown in FIG. 17, as card 1403 is dropping below the table or shortly after card 1403 drops below the table, a graphics version of a card (CGI card) 1702 having the same value (9 of spades) is presented in front of the player in some embodiments. In some embodiments, during the transition between card 1403 dropping below the table and card 1702 appearing as shown in FIG. 17, card 1702 can be rendered so as to give the impression that card 1702 is moving from the position of card 1403 on the door of mechanism 1401 to the position of card 1702 in FIG. 17. That is, card 1702 can appear to be sliding from the dealer's hand to the position of card 1702 in front of the player as shown in FIG. 17. The same can be the case for all cards presented in front of the player in some embodiments.

In some embodiments, a total value box 1704 that shows the sum of the value of the player's card(s) can be presented. In this case, the sum is 9.

Similarly, CGI card(s) 1708 are presented for the dealer's real live cards and a total value box 1706 that shows the sum of the value(s) of the dealer's card(s) can also be presented in some embodiments.

Figure 18:
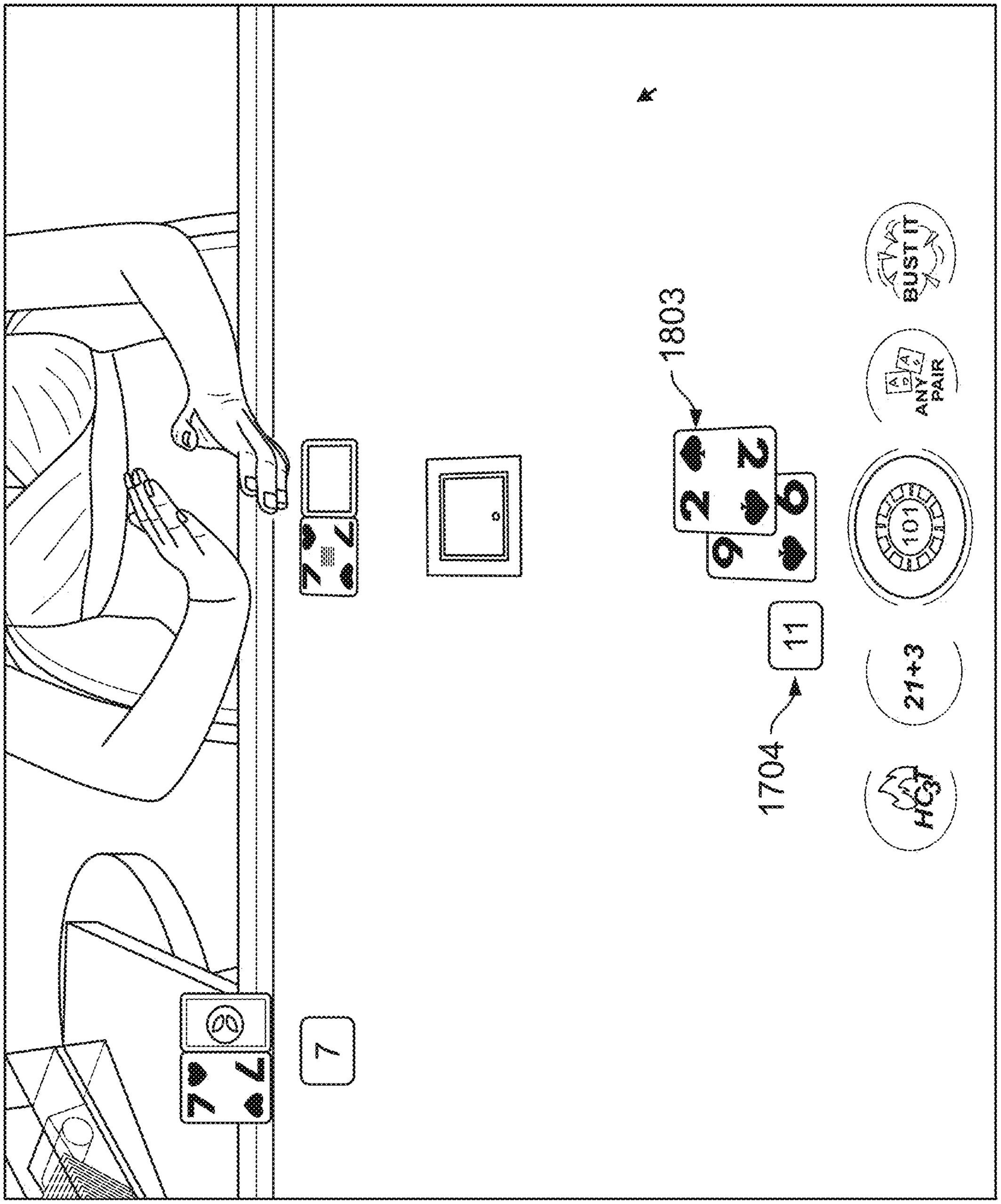
FIG. 18 is an example of a graphics version of the second card being presented to a player in accordance with some embodiments.

At around the same time, the dealer pulls card 1703 from the shoe and places it on mechanism 1401. Card 1703 is the player's second card. Similarly to what is described above in FIGS. 15-17, once card 1703 is placed on the door, the door in mechanism 1401 will lower causing the card to drop below the table. Around the same time, as shown in FIG. 18, a CGI card 1803 will be presented to the player and the total value if field 1704 will be updated (now reflecting 11).

At around the same time, the dealer pulls the dealer's second card 1710 from the shoe and places it in front of her face down.

Figure 19:
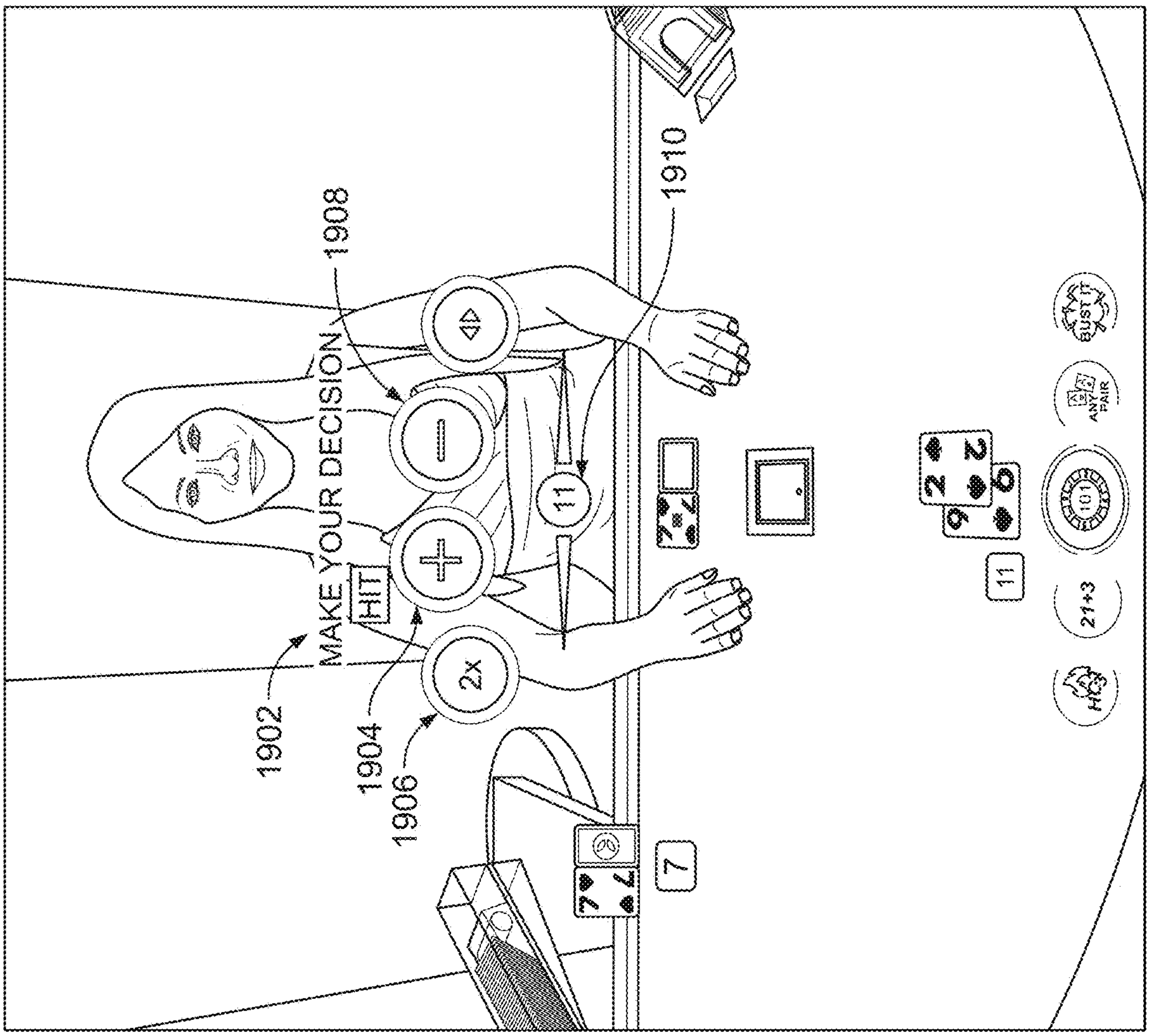
FIG. 19 is an example of another graphical user interface presented to a player in accordance with some embodiments.

The player may next be presented with a user interface as shown in FIG. 19. As illustrated, this interface includes a "make your decision" message" 1902 asking the user to take action, a hit option 1904 asking the dealer to deal a new card to the player, a stand option 1908 asking the dealer to not deal a new card to the player, a 2× option 1906 giving the player the option to double his or her bet, and a count-down timer 1910 showing how much time the player has to make his or her decision.

Figure 20:
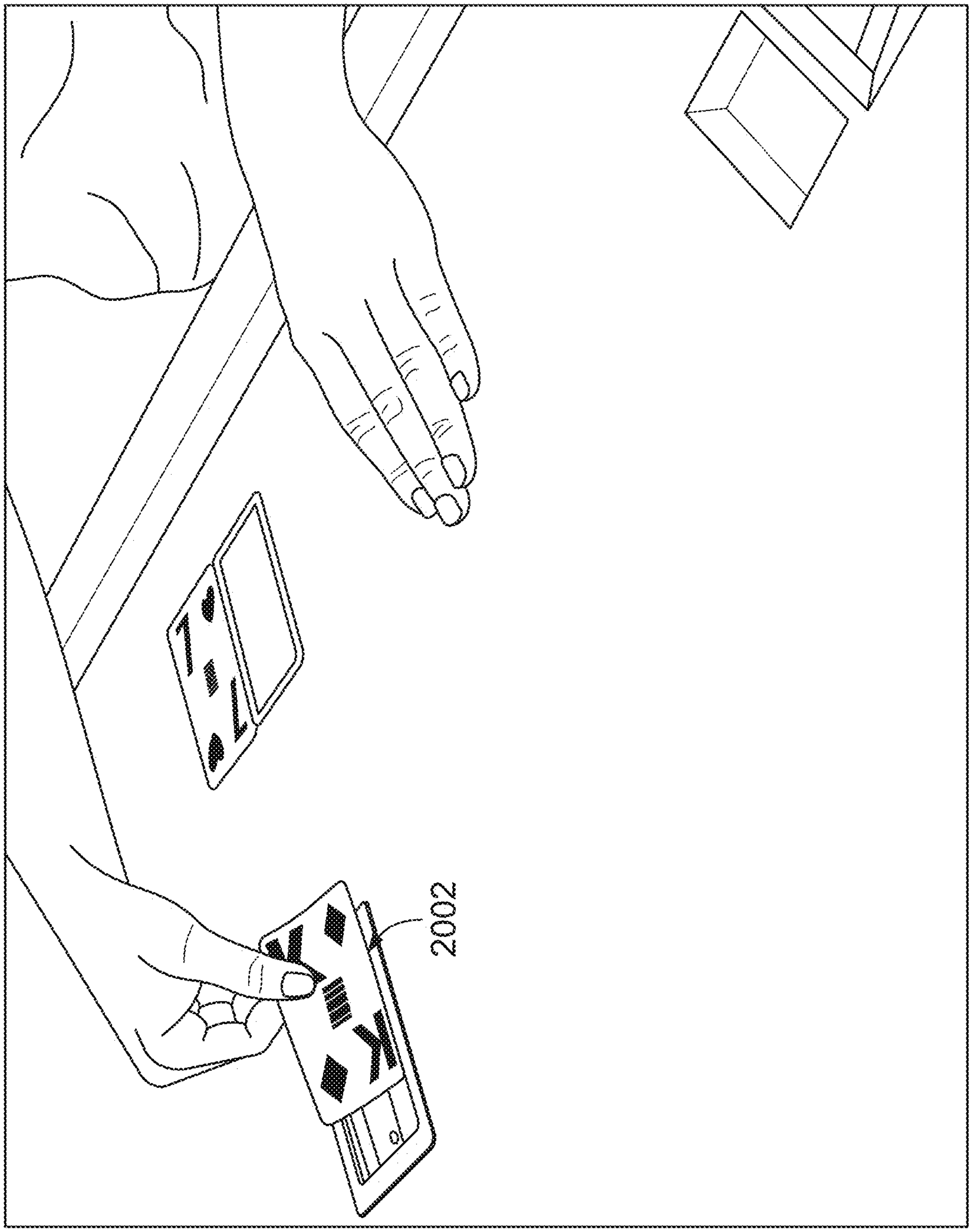
FIG. 20 is an example of the dealer dealing a third card and placing it on the door in accordance with some embodiments.
Figure 21:
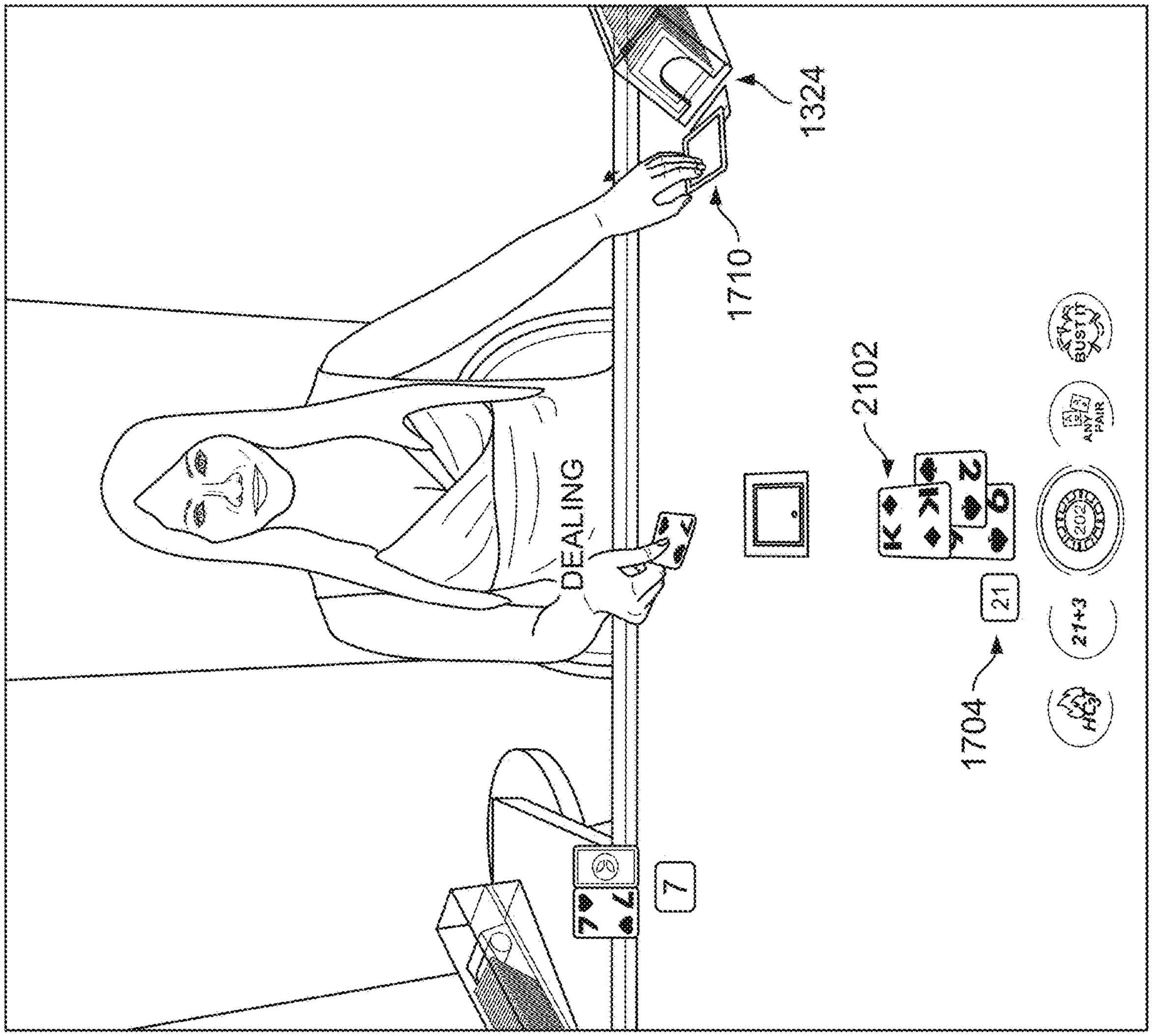
FIG. 21 is an example of a graphics version of the third card being presented to a player in accordance with some embodiments.

As shown in FIG. 20, the dealer may next deal another player card 2002 (king of diamonds) and place the card on mechanism 1401. After this card is placed on mechanism 1401, the door will open and the card will drop below the table. Around the same time, as shown in FIG. 21, a CGI version 2102 of card 2002 will be present in front of the player, and total field 1704 will be updated (to show 21).

Figure 22:
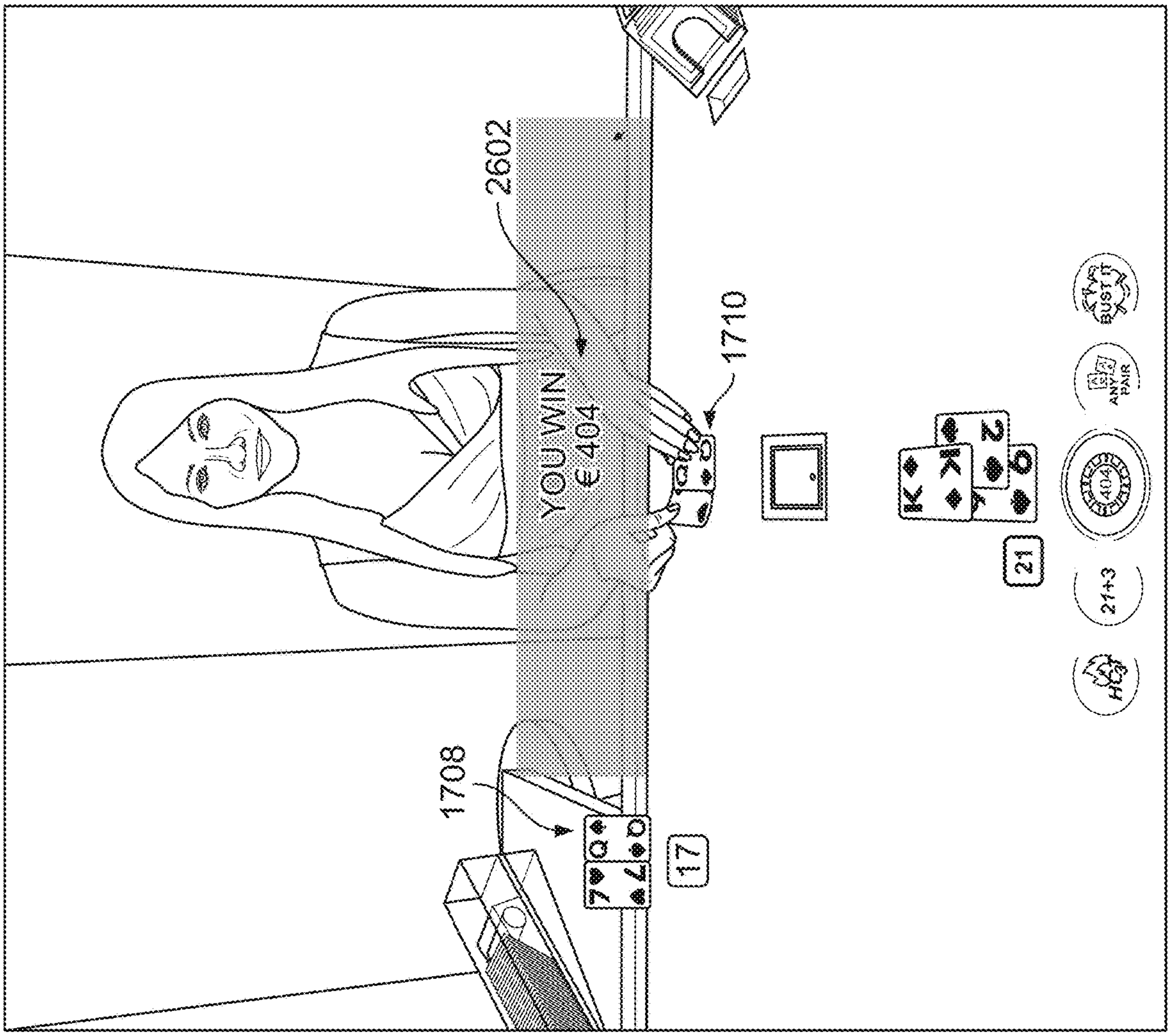
FIG. 22 is an example of still another graphical user interface in accordance with some embodiments.

Around the same time, the dealer may re-scan her second card 1710 using scanner 1324 so that a computer monitoring the game can be certain of the value of the dealer's second card. In response to this, as shown in FIG. 22, dealer CGI cards 1708 can be update to show CGI versions of the dealer's real live cards (including card 1710), the total value of the dealer's cards can be updated to show 17, and a message 2602 can be presented showing that the player won (in this case, 404 Euros).

From a player's point of view, the cards he or she is dealt are retained (or ignored) depending on his or her game decisions. In this way, mechanism 1401 enables a scalable Blackjack game that can be played by one, one hundred, one thousand, or any other suitable number of players.

As described above, an online game can be presented to a user using real live cards and real live dealer on a physical table including a mechanism for removing the cards from the table. Any of the operations other than the ones describe above as being performed by the dealer can be performed under the control of a one of more computers.

For example, detecting that a card is on door 102 of mechanism 101, detecting the position of door 102, opening and closing of door 102, positioning container 805 or 901 by mechanism 101 or by the dealer, scanning cards, causing graphics to be presented to a user, receiving gaming input from a player, generating prompts to the player, determining the outcomes of games, and/or any other suitable functions described herein can be controlled and/or performed by a computer.

Figure 23:
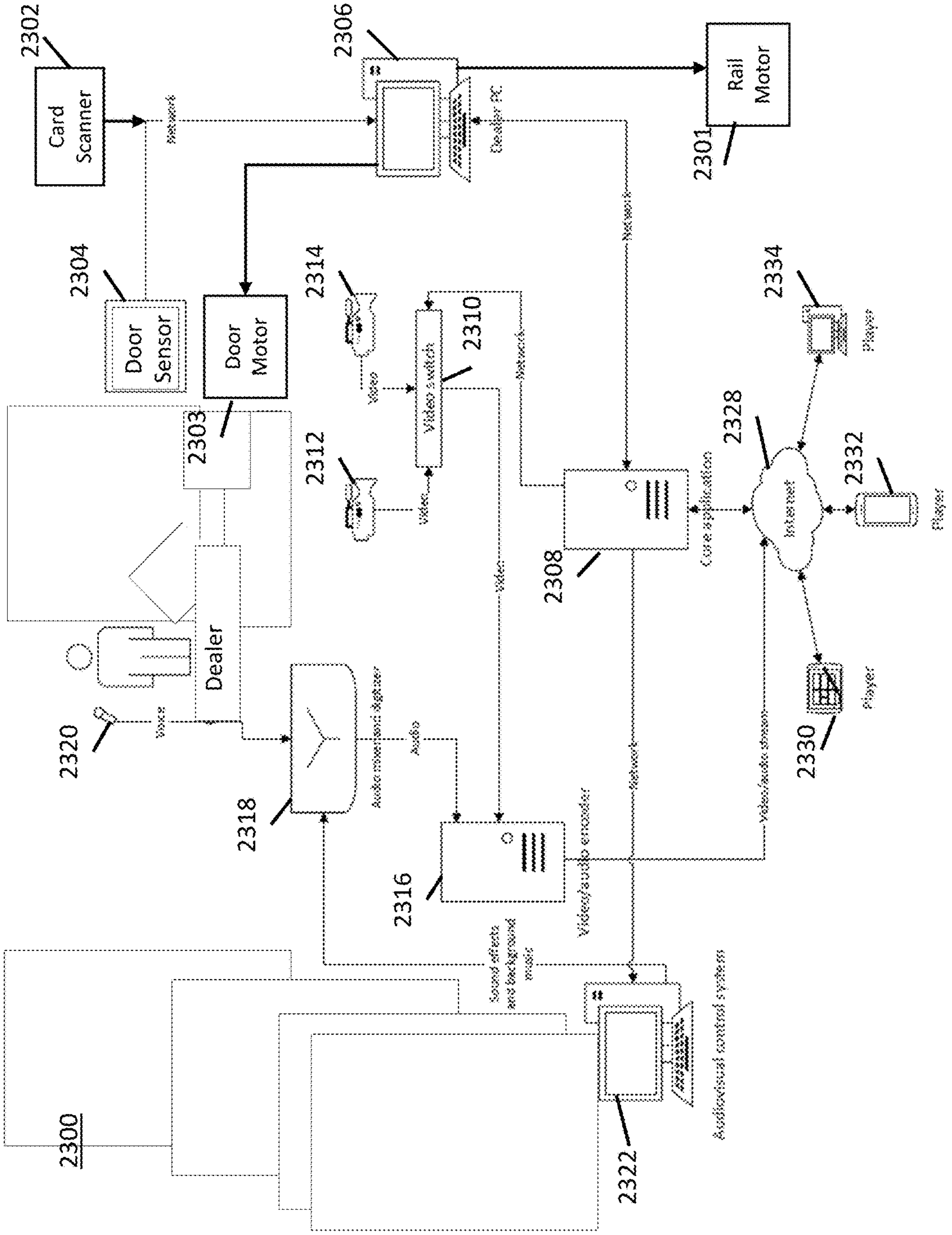
FIG. 23 is an example of a system for implementing Internet-based wagering in accordance with some embodiments.
Figure 24:
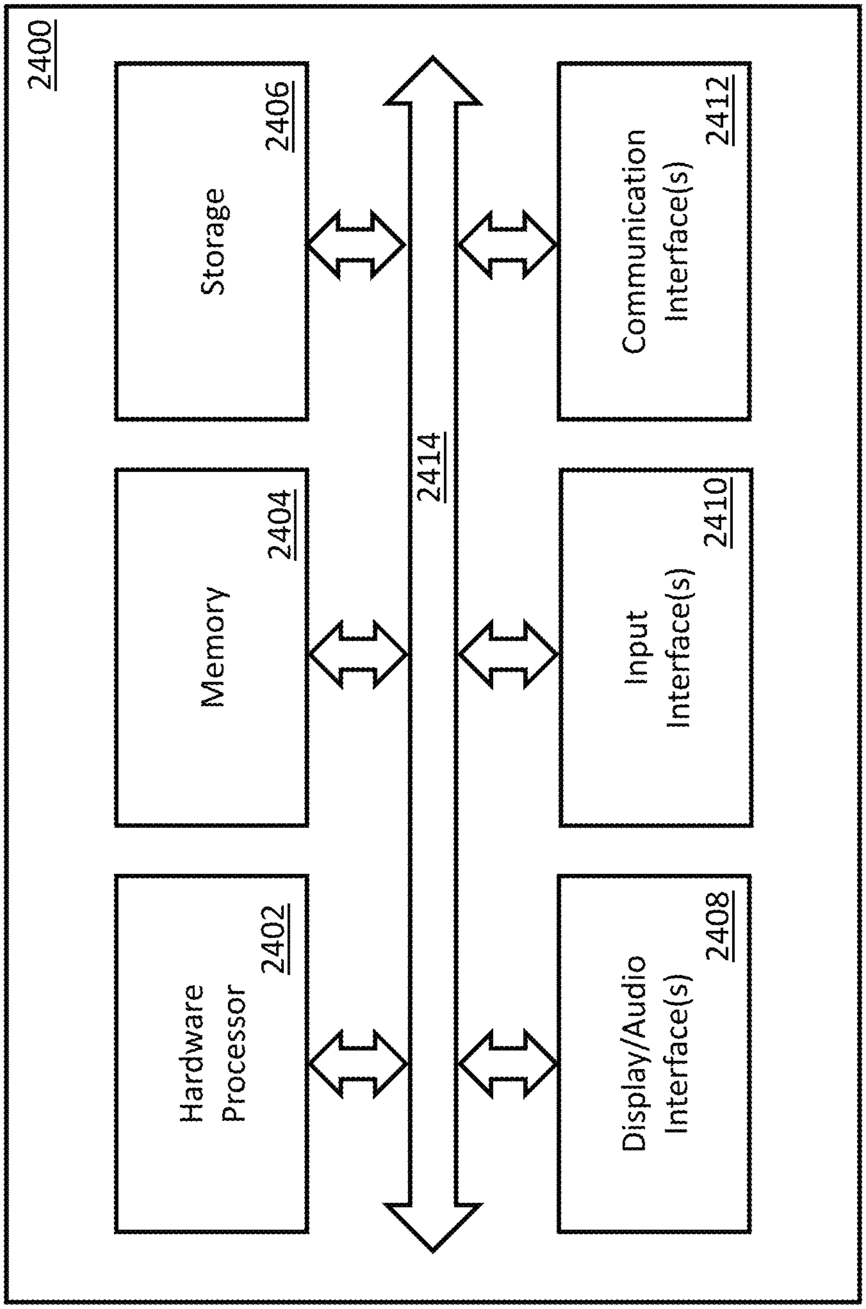
FIG. 24 is an example of hardware that can be used in the system of FIG. 23 in accordance with some embodiments.

Turning to FIG. 23, an example 2300 of a system for implementing Internet-based wagering in accordance with some embodiments is shown. As illustrated, system 2300 includes a rail motor 2301, a card scanner 2302, a door motor 2303, a door sensor 2304, a dealer computer 2306, a core application computer 2308, a video switch 2310, cameras 2312 and 2314, a video/audio encoder 2316, an audio mixer and digitizer 2318, a microphone 2320, an audiovisual control system 2322, an LED driver 2324, an LED matrix 2326, a computer network 2328, a tablet player device 2330, a smart phone player device 2332, and a computer player device 2334.

Rail motor 2301 can be any suitable motor (as described above) for moving a container of cards in some embodiments.

Card scanner 2302 can be any suitable scanner for scanning cards, such as a barcode scanner, in some embodiments.

Door motor 2303 can be any suitable motor (as described above) for opening and closing door 102 in some embodiments.

Door sensor 2304 can be any suitable sensor for detecting a card on the door as described above in some embodiments.

Dealer computer 2306 can be any suitable computer that can be used by a dealer to monitor game activity in some embodiments. For example, in some embodiments, computer 2306 can be used to scan cards, present their values to the dealer, provide any suitable information to the dealer, detect whether a card is on the door, control the door motor, control the rail motors, view video feeds, and to see gaming data relating to bets, payouts, previous plays, and/or any other suitable data.

Core application computer 2308 can be any suitable computer that controls the activity of the game being presented by system 2300 in some embodiments. This can include generating user interfaces, presenting user interfaces to devices 2330, 2332, and 2334, receiving input from players via those user interfaces, receiving bet information, causing money wagered to be collected, receiving data from sensor 2304 and/or computer 2306, applying game rules, determining payouts, causing payout money to be paid, controlling video that is streamed to players, and/or any other suitable functions.

Video switch 2310 can receive video from cameras 2312 and 2314 and provide it to video/audio encoder 2316 in some embodiments. Any suitable video switch can be used in some embodiments.

Video/audio encoder 2316 can be any suitable video and/or audio encoder in some embodiments. In some embodiments, encoder 2316 can be implemented as multiple encoders, any of which encoders can be different from any others of the encoders. For example, when using multiple encoders, some may be video encoders and some may be audio encoders. Some may be high definition encoders, while others can be standard definition encoders, as another example.

Audio mixer and digitizer 2318 can be any suitable audio mixer and digitizer for receiving sound-effect signals and background-music signals from audiovisual control system 2322 and voice signals from microphone 2320, mixing those signals, digitizing those signals, and providing those signals to encoder 2316 in some embodiments.

Microphone 2320 can be any suitable microphone for capturing the voice of a dealer in some embodiments. In some embodiments, microphone 2320 can be part of another device, such as a headset, one of cameras 2312 and 2314, etc.

Audiovisual control system 2322 can be any suitable computer system for controlling sound effects, background music, light emitting diodes, any other suitable lights, etc. in some embodiments. In some embodiments, system 2322 can receive inputs from core application computer 2308 that causes special sounds and/or lights (or any other effects) to be presented when certain events happen during the course of play (e.g., such as a big payout being paid).

Computer network 2328 can be any suitable communication network or combination of communication networks that can be used by a device 2330, 2332, and/or 2334 for communicating with the remainder of system 2300 in some embodiments. For example, network 2328 can include the Internet, one or more mobile telephone networks, one or more mobile data networks, one or more cable television networks, one or more satellite networks, one or more WiFi networks, one or more local area networks, one or more wide area networks, and/or any other one or more suitable communication networks in some embodiments.

Player devices 2320, 2332, and 2334 can be any suitable devices for interacting with the remainder of system 2300 in some embodiments. For example, as shown in the figures, these devices can present a user interface, video, and audio that can allow a player to experience a wagering game in some embodiments. The devices can receive bets via the interface, indicate account balance, indicate past plays, provide video and/or audio of the gaming table, provide video and/or audio of the dealer, provide video and/or audio of the graphics, audio effects, music, etc., capture video and/or audio of a player using one of the devices, capture text input of the player, provide video and/or audio of other players, present text input of the other players, etc. in some embodiments.

Components 2306, 2308, 2316, 2322, 2330, 2332, and 2334 can be implemented using any suitable hardware in some embodiments. For example, in some embodiments, these components can be implemented using any suitable general-purpose computer or special-purpose computer. Any such general-purpose computer or special-purpose computer can include any suitable hardware in some embodiments. For example, as illustrated in example hardware 2400 of FIG. 24, such hardware can include hardware processor 2402, memory 2404, storage 2406, display/audio interface(s) 2408, input interface(s) 2410, communication interface(s) 2412, and a bus 2414 in some embodiments.

Hardware processor 2402 can include any suitable hardware processor, such as a microprocessor, a micro-controller, digital signal processor(s), dedicated logic, and/or any other suitable circuitry for controlling the functioning of a general-purpose computer or a special-purpose computer in some embodiments.

Memory 2404 can be any suitable memory for storing programs, data, media content, and/or any other suitable information in some embodiments. For example, memory 2404 can include random access memory, read-only memory, flash memory, and/or any other suitable memory in some embodiments.

Storage 2406 can be any suitable storage for storing programs, data, media content, and/or any other suitable information in some embodiments. For example, storage 2406 can include flash memory, hard disk drive, optical media, and/or any other suitable storage in some embodiments.

Display/audio interface(s) 2408 can be any suitable circuitry for controlling and driving output to one or more display/audio output circuitries in some embodiments. For example, display/audio interface(s) 2408 can be circuitry for driving an LCD display, a speaker, an LED, or any other type of output device in some embodiments.

Input interface(s) 2410 can be any suitable circuitry for controlling and receiving input from any suitable input device(s) in some embodiments. For example, input interface(s) 2410 can be any suitable circuitry for receiving input from an input device, such as a touch screen, from one or more buttons, from a voice recognition circuit, from a microphone, from a camera, from an optical sensor, from an accelerometer, from a temperature sensor, from a near field sensor, and/or any other type of input device in some embodiments.

Communication interface(s) 2412 can be any suitable circuitry for interfacing with one or more communication networks, such as network 2328 as shown in FIG. 23 in some embodiments. For example, interface(s) 2412 can include network interface card circuitry, wireless communication circuitry, and/or any other suitable type of communication network circuitry in some embodiments.

Bus 2414 can be any suitable mechanism for communicating between two or more components 2402, 2404, 2406, 2408, 2410, and 2412 in some embodiments.

Any other suitable components can be included in hardware 2400 in accordance with some embodiments.

It should be understood that at least some of the above described portions of the processes described herein can be executed or performed in any order or sequence not limited to the order and sequence described. Also, some portions of these processes can be executed or performed substantially simultaneously where appropriate or in parallel to reduce latency and processing times. Additionally or alternatively, some of the above described portions of the processes can be omitted.

In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for removing a card from a gaming table comprising:
- a gaming table having a table surface; and
- a door mounted on the table surface,
- wherein the door is configured to open so that a playing card placed on the door moves to a space below the table surface.

2. The system of claim 1, further comprising a hardware processor that detects when the playing card is placed on the door and controls the opening of the door.

3. The system of claim 2, further comprising a stepper motor that is controlled by the hardware processor and that is coupled to the door so that the stepper motor can cause the door to open under the control of the hardware processor.

4. The system of claim 1, further comprising a sensor on the door that detects the presence of the playing card on the door.

5. The system of claim 4, wherein the sensor is an optical sensor.

6. The system of claim 1, further comprising a hardware processor that generates a graphics version of the playing card and presents the graphics version of the playing card on a player's computer display after the playing card has slid below the table surface.

7. The system of claim 1, further comprising a container positioned below the table surface that captures the playing card.

8. The system of claim 7, further comprising:
- a rail to which the container is coupled; and
- a motor that causes the container to move from a position proximate to the door to a position proximate to a dealer.

9. The system of claim 7, wherein the container has an angled platform that is at an angle of 52 degrees relative to a side of the container going from a top of the container to a bottom of the container.

10. A method for removing a card from a gaming table comprising:
- causing, by a hardware processor, a door on a table surface of a gaming table to open so that a playing card placed on the door moves to a space below the table surface.

11. The method of claim 10, further comprising detecting when the playing card is placed on the door.

12. The method of claim 11, wherein the detecting uses a sensor on the door that detects the presence of the playing card on the door.

13. The method of claim 12, wherein the sensor is an optical sensor.

14. The method of claim 10, further comprising controlling the opening of the door using a hardware processor.

15. The method of claim 14, further comprising using a stepper motor to control the opening of the door.

16. The method of claim 10, further comprising:

generating a graphics version of the playing card; and presenting the graphics version of the playing card on a player's computer display after the playing card has slid below the table surface.

17. The method of claim 10, further comprising positioning a container below the table surface that captures the playing card.

18. The method of claim 17, further comprising:

causing the container to automatically move from a position proximate to the door to a position proximate to a dealer.

19. The method of claim 17, wherein the container has an angled platform that is at an angle of 52 degrees relative to a side of the container going from a top of the container to a bottom of the container.

20. A non-transitory computer-readable medium containing computer executable instructions that, when executed by a processor, cause the processor to perform a method for removing a card from a gaming table, the method comprising:

causing a door on a table surface of a gaming table to open so that a playing card placed on the door moves to a space below the table surface.

21. The non-transitory computer-readable medium of claim 20, wherein the method further comprises detecting when the playing card is placed on the door.

22. The non-transitory computer-readable medium of claim 21, wherein the detecting uses a sensor on the door that detects the presence of the playing card on the door.

23. The non-transitory computer-readable medium of claim 22, wherein the sensor is an optical sensor.

24. The non-transitory computer-readable medium of claim 20, wherein the method further comprises:

generating a graphics version of the playing card; and presenting the graphics version of the playing card on a player's computer display after the playing card has slid below the table surface.

25. The non-transitory computer-readable medium of claim 24, wherein the method further comprises causing a stepper motor to control the opening of the door.

26. The non-transitory computer-readable medium of claim 20, wherein the method further comprises controlling the opening of the door.

27. The non-transitory computer-readable medium of claim 20, wherein the method further comprises causing a container to automatically move from a position proximate to the door to a position proximate to a dealer.

* * * * *